(12) United States Patent
Shin et al.

(10) Patent No.: US 11,627,521 B2
(45) Date of Patent: Apr. 11, 2023

(54) APPARATUS AND METHOD FOR CONFIGURING BACKHAUL LINK IN WIRELESS COMMUNICATION SYSTEM

(71) Applicant: Samsung Electronics Co., Ltd., Suwon-si (KR)

(72) Inventors: Yeonchul Shin, Suwon-si (KR); Hyeongmin Nam, Suwon-si (KR); Suhyun Kim, Suwon-si (KR); Inkook Chang, Suwon-si (KR); Joonsung Chun, Suwon-si (KR); Chulhoon Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/740,119

(22) Filed: Jan. 10, 2020

(65) Prior Publication Data
US 2020/0229078 A1 Jul. 16, 2020

(30) Foreign Application Priority Data
Jan. 11, 2019 (KR) .......................... 10-2019-0003834

(51) Int. Cl.
*H04W 48/18* (2009.01)
*H04W 24/10* (2009.01)
*H04W 88/06* (2009.01)

(52) U.S. Cl.
CPC .......... *H04W 48/18* (2013.01); *H04W 24/10* (2013.01); *H04W 88/06* (2013.01)

(58) Field of Classification Search
CPC . H04W 24/10; H04W 88/06; H04W 56/0015; H04W 48/16; H04W 72/046;
(Continued)

(56) References Cited

U.S. PATENT DOCUMENTS 7,606,189 B1 * 10/2009 Lee ........................ H04W 92/02
370/328
2005/0124339 A1 6/2005 Lau
(Continued)

FOREIGN PATENT DOCUMENTS

KR 10-2013-0061410 A 6/2013
KR 10-2016-0114099 A 10/2016

OTHER PUBLICATIONS

European Search Report in connection with European Application No. 20151170.6 dated May 25, 2020, 8 pages.
(Continued)

*Primary Examiner* — Dai Phuong

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A network providing device includes at least one transceiver, and at least one processor operatively coupled with the at least one transceiver. The at least one processor is configured to acquire a measurement result of a signal transmitted by a first cellular network, and transmit, to a router, a control message for setting a router to access a network identified on the basis of the measurement result. The network comprises at least one of the first cellular network and a second cellular network.

6 Claims, 22 Drawing Sheets

(58) Field of Classification Search
CPC ............ H04W 36/0085; H04W 84/042; H04L 5/0023; H04L 5/001; H04L 5/0053; H04L 5/0048; H04B 17/318; H04B 17/382; H04B 7/088; H04B 7/0695
See application file for complete search history.

(56) References Cited

U.S. PATENT DOCUMENTS

| | | | |
|---|---|---|---|
| 2006/0052105 A1* | 3/2006 | Yeh | H04W 36/30 455/439 |
| 2009/0109925 A1* | 4/2009 | Nakamura | H04W 12/0433 370/331 |
| 2009/0170517 A1* | 7/2009 | Karlsson | H04W 36/0055 455/436 |
| 2012/0051260 A1* | 3/2012 | Tamaki | H04W 24/02 370/253 |
| 2012/0188890 A1* | 7/2012 | Tabata | H04B 17/23 370/252 |
| 2012/0258671 A1* | 10/2012 | Oota | H04W 84/047 455/67.13 |
| 2012/0315916 A1* | 12/2012 | Van Phan | H04W 36/08 455/442 |
| 2013/0244736 A1* | 9/2013 | Ho | H04W 52/0206 455/574 |
| 2014/0023038 A1* | 1/2014 | Venkatachalam | H04W 48/10 370/331 |
| 2014/0254560 A1 | 9/2014 | Kamel et al. | |
| 2017/0181070 A1 | 6/2017 | Gupta | |
| 2018/0227821 A1* | 8/2018 | Tsai | H04W 36/30 |
| 2019/0097781 A1* | 3/2019 | Tang | H04W 72/042 |
| 2021/0014850 A1* | 1/2021 | Rofougaran | H04W 56/0015 |

OTHER PUBLICATIONS

Intellectual Property India, "Examination report under sections 12 & 13 of the Patents Act," dated Feb. 6, 2023, in connection with Indian Patent Application No. 202014001167, 5 pages.

Korean Intellectual Property Office, "Office Action," dated Feb. 8, 2023, in connection with Korean Patent Application No. KR10-2019-0003834, 10 pages.

* cited by examiner

APPARATUS AND METHOD FOR CONFIGURING BACKHAUL LINK IN WIRELESS COMMUNICATION SYSTEM

CROSS-REFERENCE TO RELATED APPLICATION

This application is based on and claims priority under 35 U.S.C. § 119 to Korean Patent Application No. 10-2019-0003834 filed on Jan. 11, 2019 in the Korean Intellectual Property Office, the disclosure of which is incorporated by reference herein in its entirety.

BACKGROUND

1. Field

The present disclosure generally relates to a wireless communication system, and more particularly, relates to an apparatus and method for configuring a backhaul link in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The above information is presented as background information only to assist with an understanding of the present disclosure. No determination has been made, and no assertion is made, as to whether any of the above might be applicable as prior art with regard to the present disclosure.

SUMMARY

On the basis of the above-described discussion, the present disclosure provides an apparatus and method for adaptively configuring a backhaul link according to a channel state in a wireless communication system.

Also, the present disclosure provides an apparatus and method for configuring a suitable backhaul link per service flow in a wireless communication system.

Also, the present disclosure provides an apparatus and method for increasing an indoor wireless network transmission efficiency through a communication related equipment supporting mmWave in a wireless communication system.

A network providing device of various embodiments of the present disclosure may include at least one transceiver, and at least one processor operatively coupled with the at least one transceiver. The at least one processor may be configured to acquire a measurement result of a signal transmitted by a first cellular network, and transmit, to a router, a control message for setting a router to access a network identified on the basis of the measurement result. The network may include at least one of the first cellular network and a second cellular network.

A router device of various embodiments of the present disclosure may include at least one transceiver, and at least one processor operatively coupled with the at least one transceiver. The at least one processor may be configured to receive a control message related with at least one network among a first cellular network and a second cellular network, configure a backhaul link of the router, on the basis of the control message, and perform access to a network of the configured backhaul link. The backhaul link may include at least one of a first backhaul link related with the first cellular network and a second backhaul link related with the second cellular network.

An operation method of a network providing device of various embodiments of the present disclosure may include acquiring a measurement result of a signal transmitted by a first cellular network, and transmitting, to a router, a control message for setting the router to access a network identified on the basis of the measurement result. The network may include at least one of the first cellular network and a second cellular network.

An operation method of a router of various embodiments of the present disclosure include receiving a control message related with at least one network among a first cellular network and a second cellular network, configuring a backhaul link of the router, on the basis of the control message, and performing access to a network of the configured backhaul link. The backhaul link may include at least one of a first backhaul link related with the first cellular network and a second backhaul link related with the second cellular network.

An apparatus and method of various embodiments of the present disclosure may enhance a convenience in a user aspect and save a cost of installation and management in a service provider aspect, by configuring a backhaul link through a network providing device supporting a mmWave communication system.

An effect obtainable from the disclosure is not limited to the above-mentioned effects, and other effects not mentioned will be able to be apparently understood from the following statement by a person having ordinary skill in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
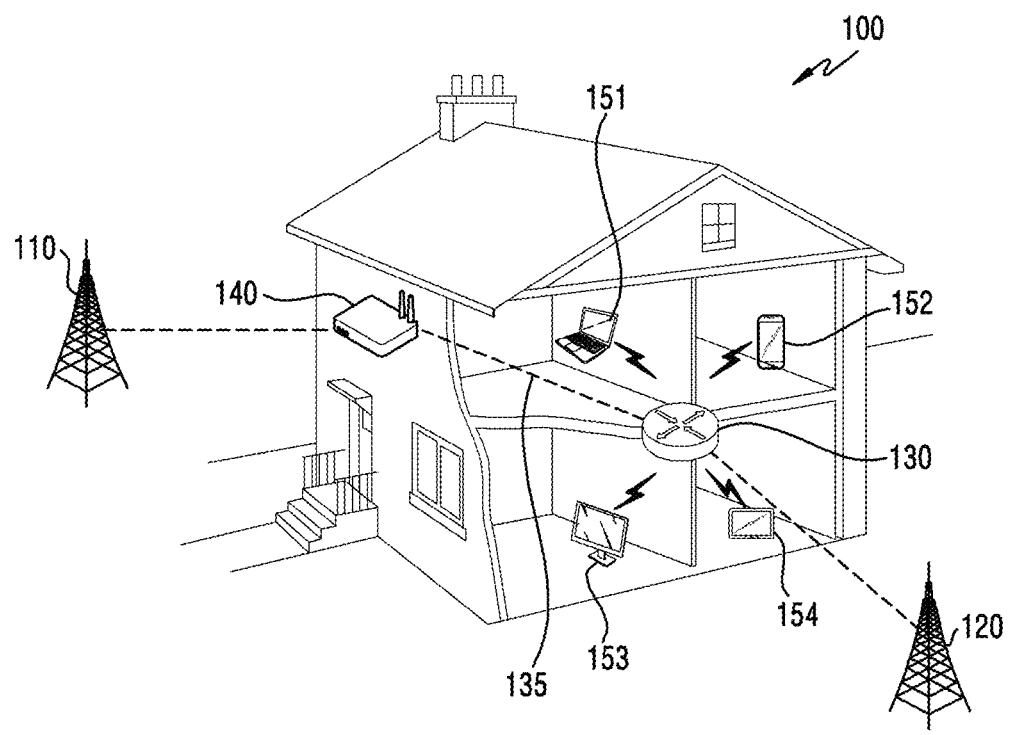
FIG. 1 illustrates a network environment according to various embodiments of the present disclosure.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Terms used in the present disclosure are used to just describe specific embodiments, and may have not an intention to limit the scope of other embodiments. The expression of a singular form may include the expression of a plural form unless otherwise dictating clearly in context. The terms used herein including the technological or scientific terms may have the same meanings as those generally understood by a person having ordinary skill in the art mentioned in the present disclosure. Among the terms used in the present disclosure, terms defined in a general dictionary may be interpreted as the same or similar meanings as the contextual meanings of a related technology, and are not interpreted as ideal or excessively formal meanings unless defined clearly in the present disclosure. According to cases, even the terms defined in the present disclosure may not be construed as excluding embodiments of the present disclosure.

In various embodiments of the present disclosure described below, a hardware access method is explained as an example. However, various embodiments of the present disclosure include a technology using both hardware and software, so various embodiments of the present disclosure do not exclude a software based access method.

Electronic devices performing wired/wireless communication such as computers and terminals may be connected to a router providing Ethernet or a wireless local area network (LAN) for the sake of an Internet service, besides a scheme of directly accessing a cellular network. The router may access Internet through a backhaul link. For example, the router may be wiredly connected with Internet through Ethernet or be wirelessly connected with Internet through a cellular network (e.g., long term evolution (LTE)). Here, a technology of selecting the backhaul link in the router may be denoted as backhaul selection. For example, the router may set wired backhaul through Ethernet, as a primary backhaul link and then, in response to Internet connection through Ethernet being unstable, preliminarily use an LTE communication scheme as a secondary backhaul link.

In a 5G communication system, discussion is made on a technology of replacing backhaul communication of a system using wired backhaul such as customer-premises equipment (CPE) with broadband wireless communication using the 5G communication system. A representative technology for increasing a transmission rate in the 5G communication system may be broadband communication using mmWave. At this time, owing to a frequency characteristic of mmWave having low permeability, when a mmWave communication based wireless backhaul is used, there may be a limitation in an installation position in which a communication modem is installed close to an outer wall of a building. A mmWave based signal has low permeability and thus its performance may be rapidly varied due to a change of a peripheral environment such as an obstacle, etc. So, a way for providing a stable backhaul link is demanded.

In the following description, a term denoting signaling (e.g., information, a message, and a signal), a term denoting network entities (e.g., a node, an instrument, a device, and equipment), a term denoting a constituent element of a device, and the like are exemplified for description convenience's sake. Accordingly, the present disclosure is not limited to the terms described later, and may use other terms having equivalent technological meanings.

Also, the present disclosure explains various embodiments by using the terms used in some communication standards (e.g., 3rd generation partnership project (3GPP)), but these are just examples for explanation. Various embodiments of the present disclosure may be easily modified and applied even to other communication systems.

FIG. 1 illustrates a network environment 100 according to various embodiments of the present disclosure. The network environment 100 includes a first base station 110, a second base station 120, a router 130, a network providing device 140, and client devices 151, 152, 153, and 154. The first base station 110 and the second base station 120 provide a radio access network for Internet connection. The router 130 refers to a device for smooth Internet connection of client devices. The network providing device 140 refers to a device interlocking with the router 130 so as to provide an access network.

Referring to FIG. 1, the first base station 110 and the second base station 120 are a network infrastructure providing radio access to an electronic device (e.g., a CPE, a terminal, an AP, etc.). The first base station 110 and the second base station 120 each have coverage defined as a specific geographical area on the basis of a distance capable of transmitting a signal. The first base station 110 and the second base station 120 may be each denoted as, besides the base station, an 'access point (AP)', a 'wireless point', a 'transmission/reception point (TRP)', a 'distributed unit (DU)', a 'radio unit (RU)', an 'access unit (AU)', a 'remote radio head (RRH)', or other terms having a technological meaning equivalent to these.

According to various embodiments, the first base station 110 and the second base station 120 may be related with mutually different communication systems. That is, devices for accessing the first base station 110 or the second base station 120 may access respective base stations through mutually different radio access technologies (RAT). Here, the wireless access may mean access to a cellular network or a mobile network. A communication system provided through the first base station 110 may be a 5G communication system. For example, the first base station 110 may provide a cellular network of Pre 5th generation (5G), v5G, or new radio (NR) of 3GPP. The first base station 110 may be denoted as '5G node', '5G NodeB (5GNB)', and 'gNB'. Also, a communication system provided through the second base station 120 may be a 4G communication system. For example, the second base station 120 may provide a cellular network of an LTE communication scheme. The second base station 120 may be denoted as 'eNodeB (eNB)'.

Below, for description convenience's sake, a wireless access technology for accessing the first base station 110 is denoted as a first RAT, and a wireless network provided by the first base station 110 is denoted as a first cellular network, and a wireless access technology for accessing the second base station 120 is denoted as a second RAT, and a wireless network provided by the second base station 120 is denoted as a second cellular network. The first cellular network is a mobile network for providing more improved service than the second cellular network, and is assumed to be provided by a 5G communication system. In the present disclosure, the 5G communication system may mean a system that is distinct from a 4G communication system (e.g., long term evolution (LTE), LTE-advanced (LTE-A), and WiMAX), a 3G communication system (e.g., wideband code division multiple access (WCDMA)), or a 2G communication system (e.g., global system for mobile communications (GSM) and code division multiple access (CDMA)).

According to various embodiments, the first cellular network may be the 5G communication system. In accordance with an embodiment, the first cellular network may be provided on a frequency band higher than that of the second cellular network. For example, the first cellular network may be related with a communication system which uses mmWave (e.g., 26 GHz, 28 GHz, 38 GHz, and 60 GHz). Also, the first cellular network may be related with a beamforming system for managing beams which are formed due to a high frequency. To explain embodiments of the present disclosure, a description is made in which the first cellular network assumes the 5G communication system, and the second cellular network assumes an LTE communication system. But, it is undoubted that embodiments of the present disclosure may be applied even to other communication systems.

To provide a service to the client devices 151, 152, 153, and 154 in the network environment 100, the router 130 may be utilized. The router 130 is a device for forming an independent network for each of the client devices 151, 152, 153, and 154, and may provide wired connection such as Ethernet or wireless connection such as Wi-Fi to each client device 151, 152, 153, and 154. The router 130 may configure a backhaul link in order to provide Internet access to each client device 151, 152, 153, and 154. The backhaul link may denote an access link which is formed by the router 130 to construct Internet connection. The router 130 may configure a backhaul link providing access to a cellular network. For example, the router 130 may have a modem supporting LTE, to perform communication with the second base station 120. On the other hand, the router 130 may provide a service to the client devices 151, 152, 153, and 154, through a communication scheme different from LTE. The router 130 may require a new communication modem in order to use a new cellular network service (for example, an NR communication service). The router 130 may access the new cellular network through the network providing device 140.

The network providing device 140 may be equipment for providing a service network. The network providing device 140 may be connected with the router 130, to provide a network of a specific wireless access scheme (e.g., NR as the 5G communication system) to the router 130. The network providing device 140 may include a communication modem or communication interface which provides a corresponding wireless access technology. The network providing device 140 may be denoted as a CPE or 5G CPE. According to various embodiments, the network providing device 140 may provide a cellular network related with a mmWave characteristic. That is, the network providing device 140 may provide access to a communication system supporting beamforming. By using the network providing device 140, the router 130 may access the first cellular network. The client device 151 may access the first base station 110, via the router 130 and the network providing device 140.

The client devices 151, 152, 153, and 154 each perform wired communication or wireless communication as electronic devices. For example, the client device 151, 152, 153, or 154 may include at least one of a cellular phone, a smartphone, a computer, a tablet personal computer (PC), a mobile phone, a video phone, an electronic book reader, a desktop PC, a laptop PC, a netbook computer, a workstation, a server, a portable digital assistant (PDA), a portable multimedia player (PMP), an MPEG-1 audio layer-3 (MP3) player, a medical device, a camera, a wearable device, or a multimedia system capable of performing a communication function. Also, it is undoubted that the type of the client device 151, 152, 153, or 154 is not limited to the above example. At least one of the client devices 151, 152, 153, and 154 may be a user device which is used by a user. For example, the client device 151, which is a laptop, may support Ethernet connection. Also, at least one of the client devices 151, 152, 153, and 154 may be managed without user's participation. For example, the client device 153 is a device performing machine type communication (MTC), and may not be carried by the user. The client device 151, 152, 153, or 154 may be denoted as, besides a terminal, a 'user equipment (UE)', a 'mobile station', a 'subscriber station', a 'remote terminal', a 'wireless terminal', an 'electronic device', a 'user device', or other terms having a technological meaning equivalent to these.

In consideration of a characteristic of a low permeability of mmWave of a 5G communication system, the network providing device 140 may be located outdoor unlike the client devices 151, 152, 153, and 154 located indoor. The network providing device 140 may be located indoor in order to provide smooth wireless access, while the router 130 may be located indoor in order to maintain smooth access with the client devices 151, 152, 153, and 154. Connection 135 between the two devices may be established because the router 130 and the network providing device 140 have a physical distance therebetween.

According to various embodiments, the connection 135 between the router 130 and the network providing device 140 may be wired connection. For example, the router 130 and the network providing device 140 may be connected by a LAN cable. The network providing device 140 may obtain the occurrence of a non line of sight (NLOS) situation with the first base station 110 by using a communication modem supporting the first cellular network. In the NLOS situation, a communication quality may be rapidly decreased according to a characteristic of mmWave. The network providing device 140 may control to change a configuration of a backhaul link of the router 130, because it can be difficult to provide a stable service. For example, the network providing device 140 may transmit a control message to the interlocked router 130. In accordance with the control message, the router 130 may change a backhaul link. For another example, the router 130 may directly change the backhaul link, by monitoring a connection state with Internet while obtaining a communication delay or connection failure occurrence. As mentioned above, by adaptively changing the backhaul link, the client devices 151, 152, 153, and 154 may continuously receive a network service.

On the other hand, when the network providing device 140 is installed outdoor, etc., at wired connection with the router 130, there may be a problem in which a beauty appearance gets bad due to a work of installation of a LAN cable for penetrating and a long cable line when a distance is far away. Also, this restriction causes a limitation of service coverage. To fix this problem, the connection 135 between the router device 130 and the network providing device 140 may be constructed wirelessly. For example, the router 130 and the network providing device 140 may be connected by a wireless LAN (e.g., Wi-Fi). The router 130 may be wirelessly connected with the network providing device 140, and be freely located in a position capable of providing the most efficient performance to the client devices (that is, premises devices). As being capable of being located in an arbitrary location, the router 130 may secure easy service coverage in consideration of connection with the network providing device 140 and connection with each client device. That is, not only when the connection 135 between the router 130 and the network providing device 140 is wired connection but also when it is wireless connection, various embodiments of the present disclosure may include embodiments which consider a quality of the corresponding connection.

In the present disclosure below, the first cellular network is described as an example of a 5G communication system (e.g., NR), and the second cellular network is described as an example of a 4G system (e.g., LTE) wherein the first cellular network means more improved communication system than the second cellular network, but embodiments of the present disclosure are not necessarily limited to these.

Operations of the present disclosure may include the operation of determining a backhaul link per packet flow transmitted/received in the router 130, and the operation of configuring a backhaul link of the router 130. Here, the configuring of the backhaul link may include the operations of changing the existing backhaul link into another backhaul link (e.g., changing an LTE backhaul link into an NR backhaul link), adding another backhaul link in addition to the existing backhaul link (e.g., LTE plus NR in the LTE backhaul link), or deleting the existing backhaul link (e.g., LTE in LTE plus NR). The aforementioned operations may be performed by the router 130 or the network providing device 140. Below, through FIG. 2A to FIG. 2B, operations by the router 130 or the network providing device 140 are described.

Figure 2A:
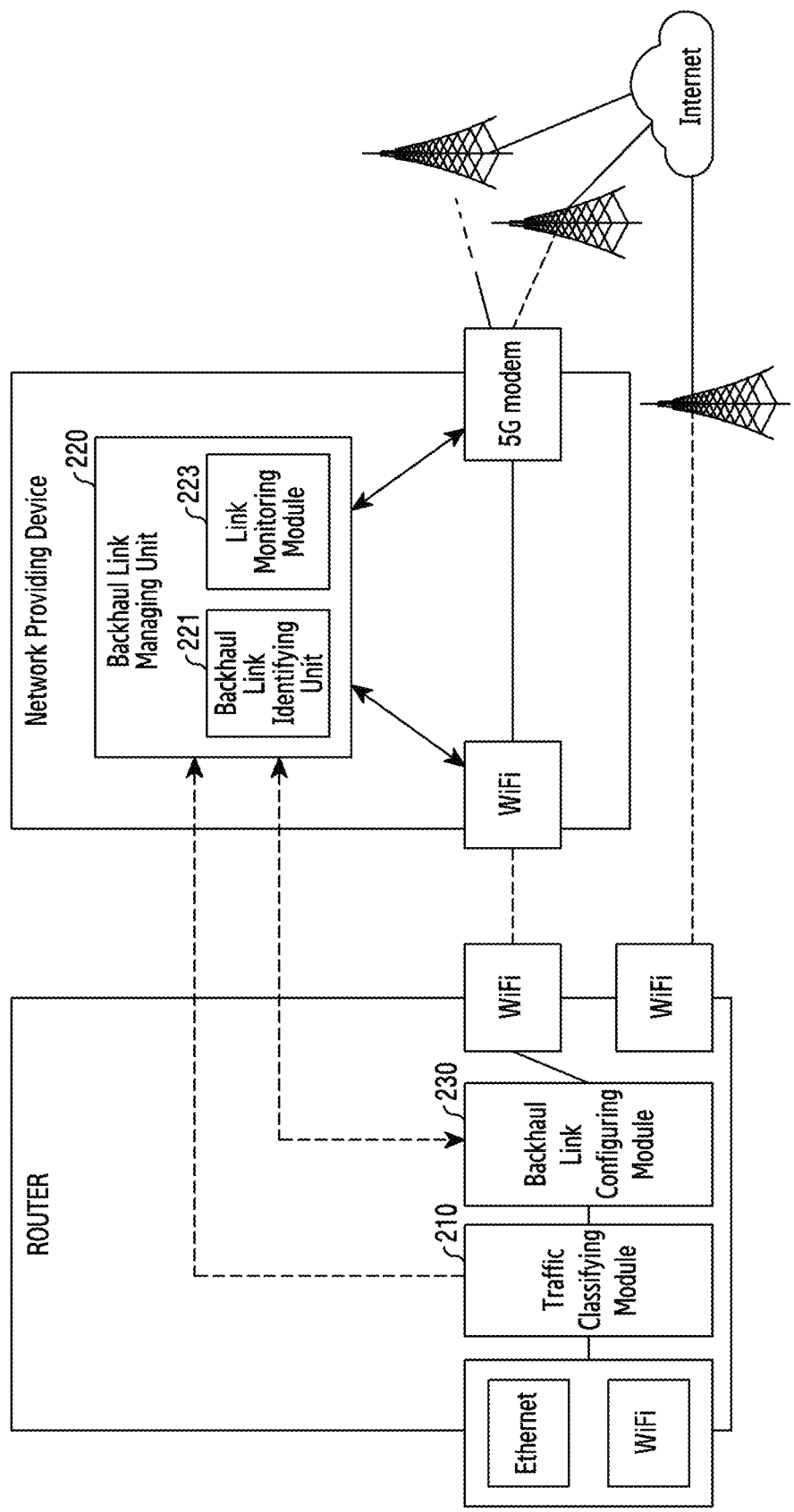
FIG. 2A illustrates an example of a router and a network providing device according to various embodiments of the present disclosure.

FIG. 2A illustrates an example of a router and a network providing device according to various embodiments of the present disclosure. The router exemplifies the router 130 of FIG. 1. The network providing device exemplifies the network providing device 140 of FIG. 1.

The router may be connected with client devices wiredly/wirelessly such as Ethernet, Wi-Fi, etc. The router may include a wired or wireless interface. Also, the router may include a wired/wireless interface such as Ethernet, Wi-Fi, etc. for connection with the network providing device, and a backhaul interface for stable backhaul connection such as LTE. Though not illustrated in FIG. 2A, the router may further include an interface for wired backhaul connection as well. The network providing device may be connected with the router through the wired or wireless interface such as Ethernet, Wi-Fi, etc. Also, the network providing device may include a communication modem for connecting to a 5G communication system (e.g., NR).

Referring to FIG. 2A, the router may include a traffic classifying module 210. The traffic classifying module 210 may classify according to whether packets intended to be transmitted or received by a client device via the router are supportable with a specific communication system every service type. For example, the traffic classifying module 210 may classify packet flows, based on whether each packet flow being on pending in the router is required to be serviced through a 5G communication system, whether it is possible to be serviced through an LTE communication system, etc. As an example, a VR service requires a large amount of data at a unitary time, so it may be required to be serviced through the 5G communication system. The traffic classifying module 210 may classify that the 5G communication system is available for a flow providing the VR service. As another example, a service related with a significant alarm is required to be necessarily transmitted, so it may be determined that the LTE communication system fulfilling more robustness in an NLOS environment than a communication scheme such as mmWave is available. The traffic classifying module 210 may classify that a flow providing an alarm service is serviceable to the LTE communication system. Besides the aforementioned examples, the traffic classifying module 210 may not specify only one communication system, but determine that it is possible to be serviced to both the LTE communication system and the 5G communication system as well. The traffic classifying module 210 may provide the classification result to a backhaul link managing unit 220 of the network providing device.

The traffic classifying module 210 may forward information about a packet flow to the network providing device. In accordance with an embodiment, the traffic classifying module 210 may be periodically forward the information about the packet flow to the network providing device. At this time, the information about the packet flow may include an Internet protocol (IP) address, a port number, a device type, a service type, a bandwidth, an importance, etc.

The network providing device may include the backhaul link managing unit 220. The backhaul link managing unit 220 may be an interface managing a configuration of a backhaul link of the router interlocked with the network providing device. The backhaul link managing unit 220 may include a backhaul link identifying unit 221 and a link monitoring module 223. The backhaul link identifying unit 221 may identify a backhaul link which will be configured by the router. The backhaul link identifying unit 221 may identify the backhaul link which will be configured by the router, based on a classification result acquired from the traffic classifying module 210 described later and a measurement result acquired from the link monitoring module 223 described later. The backhaul link identifying unit 221 may identify a backhaul link per packet flow.

The link monitoring module 223 may measure a quality of a channel for a first cellular network. Here, the quality of the channel may be, besides a beam reference signal received power (BRSRP) and a reference signal received power (RSRP), at least one of a reference signal received quality (RSRQ), a received signal strength indicator (RSSI), a signal to interference and noise ratio (SINR), a carrier to interference and noise ratio (CINR), a signal to noise ratio (SNR), an error vector magnitude (EVM), a bit error rate (BER), and/or a block error rate (BLER). Below, in the present disclosure, that a channel quality is high means that a channel quality value related with a signal magnitude is high or a channel quality value related with an error rate is small. This means that as the channel quality is high, a smooth wireless communication environment is guaranteed. The link monitoring module 223 may provide the measurement result of the channel quality to the backhaul link identifying unit 221.

In some embodiments, the link monitoring module 223 may measure a quality of a link between the network providing device and the router as well. The link between the network providing device and the router may be wireless connection. In response to the stability of the wireless connection not being secured, it is difficult to connect with the router even though a channel quality with a first base station is high, so it may be required to measure the quality of the link between the network providing device and the router. For example, to measure a state of a wireless link, the link monitoring module 223 may measure at least one of BRSRP, RSRQ, RSSI, SINR, CINR, SNR, EVM, BER, and BLER. The link monitoring module 223 may provide the measurement result of the channel quality to the backhaul link identifying unit 221.

The backhaul link identifying unit 221 may identify a backhaul link per packet flow, based on the classification result and the measurement result. After identifying a backhaul link which will be configured by the router, the backhaul link identifying unit 221 may provide a control message. Here, the control message may be a message for configuring in order for the router to access a network through the identified backhaul link. The backhaul link identifying unit 221 may transmit the provided control message to the router. For example, the backhaul link identifying unit 221 may transmit the control message to the router through wireless LAN (e.g., Wi-Fi). For another example, unlike illustrated in FIG. 2A, the backhaul link identifying unit 221 may transmit the control message to the router through Ethernet connection as well.

In some embodiments, the backhaul link identifying unit 221 may provide a control message that directly indicates a backhaul link for each packet flow. For example, the control message may be configured as in Table 1 below.

TABLE 1

| Flow ID | IP | Port | Device type | Service type | ... | Backhaul |
|---|---|---|---|---|---|---|
| 1 | 1.1.1.1 | 1 | Smartphone | Web | | 5G |
| 2 | 1.1.1.1 | 2 | Smartphone | Voice | | 5G |

TABLE 1-continued

| Flow ID | IP | Port | Device type | Service type | ... | Backhaul |
|---|---|---|---|---|---|---|
| 3 | 3.3.3.3 | 3 | VR | VR | | 5G |
| 4 | 4.4.4.4 | 4 | Sensor | Alarm | | LTE |

Here, '5G' may denote, for example, an NR communication system. 'Web' refers to a service which uses a web application, and 'Voice' refers to a voice service, and 'VR' refers to a service related with virtual reality, and 'Alarm' refers to a service related with notification.

In other some embodiments, the backhaul link identifying unit 221 may provide a control message that includes priority order of each backhaul link as well. For example, the control message may be configured as in Table 2 below.

TABLE 2

| Flow ID | IP | Port | Device type | Service type | ... | 5G | LTE |
|---|---|---|---|---|---|---|---|
| 1 | 1.1.1.1 | 1 | Smartphone | Web | | 1 | 3 |
| 2 | 1.1.1.1 | 2 | Smartphone | Voice | | 2 | 2 |
| 3 | 3.3.3.3 | 3 | VR | VR | | 3 | ∞ |
| 4 | 4.4.4.4 | 4 | Sensor | Alarm | | ∞ | 1 |

Here, '5G' may denote, for example, an NR communication system. Each of '5G' and 'LTE' represents priority order of a corresponding communication scheme. 'Web' refers to a service which uses a web application, and 'Voice' refers to a voice service, and 'VR' refers to a service related with virtual reality, and 'Alarm' refers to a service related with notification. Because a backhaul link is not directly identified but priority order is expressed as in Table 2 and a control message is transmitted, the backhaul link may be identified by the router. In accordance with an embodiment, the control message may be constructed to set a designated value (e.g., ∞) to priority order as in the third flow or fourth flow of Table 2 and use only a backhaul of a specific communication scheme.

The router may include a backhaul link configuring module 230. The backhaul link configuring module 230 may receive a control message from the network providing device. For example, the backhaul link configuring module 230 may receive a control message that includes a configuration table such as Table 1 or Table 2. The router may configure a backhaul interface per packet flow by using the backhaul link configuring module 230. That is, the backhaul link configuring module 230 may perform a function of selecting a backhaul link, i.e., a backhaul selection function according to the control message. For example, in response to the backhaul link identifying unit 221 indicating an LTE communication scheme, the backhaul link configuring module 230 may access eNB through an LTE communication modem. For another example, in response to the backhaul link identifying unit 221 indicating an NR communication scheme, the backhaul link configuring module 230 may access gNB via the network providing device through a wireless LAN interface.

As described above, the backhaul link per flow may be configured through message exchange between the network providing device and the router.

Figure 2B:
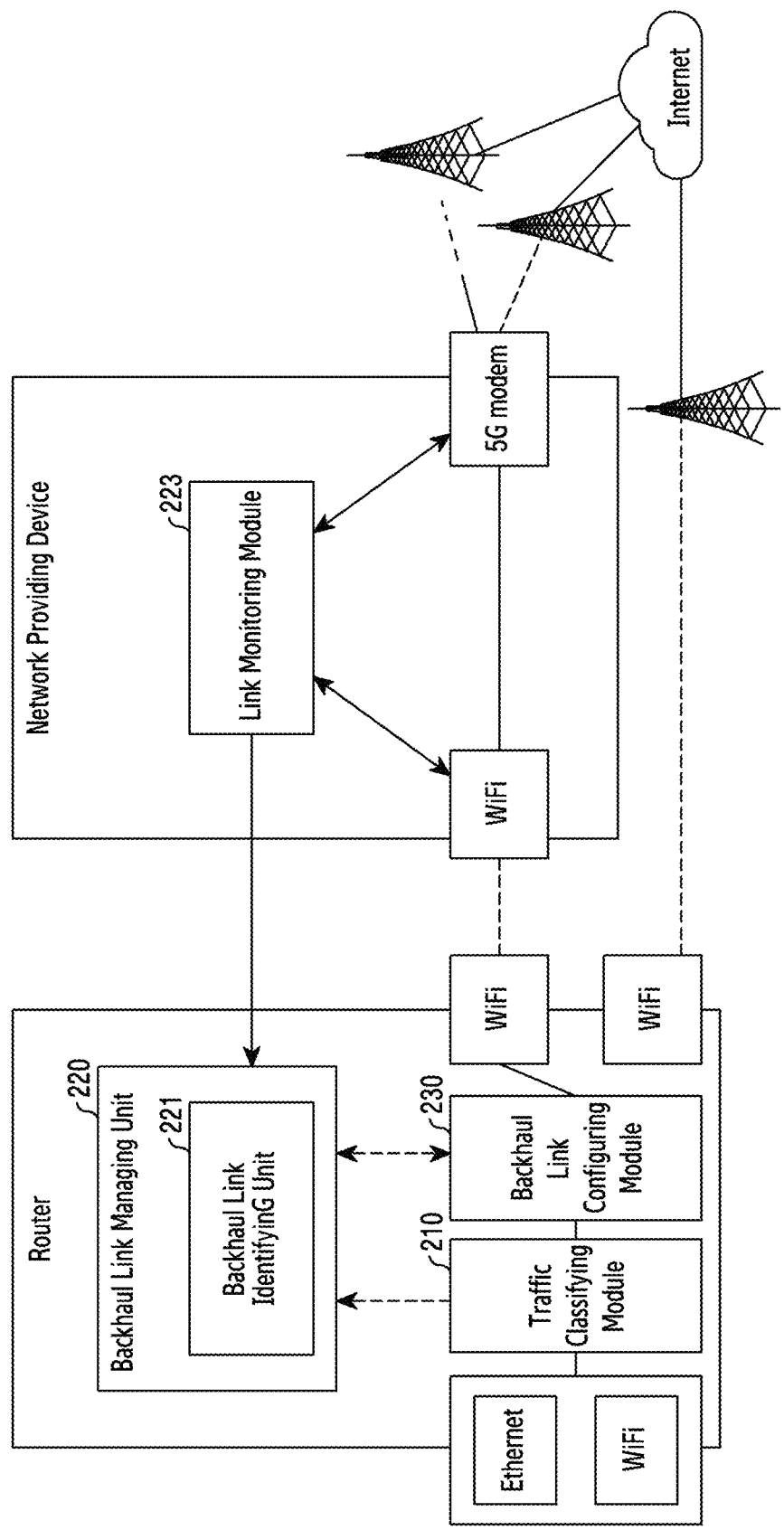
FIG. 2B illustrates another example of a router and a network providing device according to various embodiments of the present disclosure.

FIG. 2B illustrates another example of a router and a network providing device according to various embodiments of the present disclosure. The router exemplifies the router 130 of FIG. 1. The network providing device exemplifies the network providing device 140 of FIG. 1.

Referring to FIG. 2B, in some embodiments, the router may include a backhaul link identifying unit 221 unlike FIG. 2A. That is, the backhaul link identifying unit 221 of FIG. 2A may be positioned in the router, not the network providing device. That is, the network providing device may provide a measurement result to the backhaul link identifying unit 221 of the router through the communication modem. The backhaul link identifying unit 221 may identify/determine a backhaul link which will be configured by the router, based on the provided measurement result and the classification result of the traffic classifying module 210 of the router. The backhaul link identifying function of FIG. 2A is performed through the router, so a control message transmitted from the network providing device to the router may be omitted.

Besides the aforementioned difference, operations of the traffic classifying module 210, the backhaul link identifying unit 221, and the backhaul link configuring module 230 may be performed in the same scheme as the description of FIG. 2A. Below, a description of the repeated construction is omitted.

According to various embodiments, the router may change network setting. The router may not only identify a backhaul link, but also control the network setting adaptively to the backhaul link. That is, the router may change the network setting, based on a backhaul state. Here, the network setting may include all of at least one device (e.g., a notebook, a UE, a laptop, an IoT device, a wearable device, etc.) connected with the router. The backhaul state may include at least one of a channel quality of a cellular network or a link quality between the router and the network providing device. Also, in some embodiments, in response to a wireless channel quality by the network providing device being increased, the router may increase the number of devices accessible to the router. Also, in some embodiments, in response to the wireless channel quality by the network providing device being increased, the router may increase the number of maximum packet flows available. In response to the wireless channel quality by the network providing device being decreased, the router may decrease the number of maximum packet flows available. In accordance with an embodiment, a table representing a relationship between an available device and a channel quality range may be defined.

A description has been made in which the operation of identifying a backhaul link on the basis of a channel state of a 5G communication network is performed by the network providing device (e.g., CPE) in FIG. 2A, and is performed by the router in FIG. 2B, but the present disclosure is not limited to these. Some of operations related with a configuration of a backhaul link may be performed by the network providing device, and others may be performed by the router. For example, the measurement of a communication quality between the network providing device and the router may be performed by the router, and the measurement of a communication quality between the network providing device and TRP of gNB may be performed by the network providing device as well.

Besides the embodiments described in FIG. 2A and FIG. 2B, operations of embodiments of the present disclosure, and various modifications of the movement of a constituent element between devices performing respective operations may be considered. In some embodiments, the network providing device may include all of the backhaul link identifying unit 221 and the backhaul link configuring module 230 of FIG. 2A as well. The network providing device may access a cellular network through both a first RAT (e.g., an NR as the 5G communication system) and a second RAT (e.g., LTE) as well. At this time, it may be assumed that a quality of a link between the router and the network providing device is kept greater than a reference value. The network providing device may configure a backhaul link on a per-packet-flow basis.

For description convenience's sake, FIG. 2A and FIG. 2B illustrate a situation in which one router and one network providing device are connected, but various embodiments of the present disclosure are not limited to this. According to various embodiments, a plurality of network providing devices may be installed near one router, and the plurality of network providing devices may be connected with the router. In this case, the router may identify at least one network providing device which will be used for service provision among the plurality of network providing devices. The router may be connected with at least one of the plurality of network providing devices.

In some embodiments, the router may identify at least one network providing device, based on a QoS characteristic (e.g., a delay and a packet loss rate) of each network providing device among the plurality of network providing devices. For example, for the sake of a packet flow requiring a high reliability, the router may identify a network providing device having an excellent delay characteristic (that is, a short delay time). Also, for example, for the sake of a packet flow requiring a high data rate, the router may identify a network providing device supporting a wide bandwidth.

In other some embodiments, the router may identify at least one network providing device, based on a radio wave characteristic (e.g., a beam characteristic, a polarized wave characteristic, a frequency characteristic, and an antenna characteristic) of each network providing device among the plurality of network providing devices. For example, the router may identify at least one network providing device, based on a beam characteristic provided by each network providing device among the plurality of network providing devices. The beam characteristic may include at least one of a beam width, a beam count, or a pattern of beams which are being managed by each network device. The beam is radiated on a wireless channel, because having influence on the performance of the wireless channel. As an example, in response to a packet flow requiring a high data rate, the router may identify a network device providing a narrow beam width. Also, for example, the router may identify a network providing device according to a polarized wave characteristic. The polarized wave characteristic may include at least one of a linear polarized wave (e.g., a horizontal polarized wave or a vertical polarized wave) or a circular polarized wave (e.g., left-handed circular polarization (LHCP) or right-handed circular polarization (RHCP)). The router may determine a polarized wave suitable to a service type, and identify a network providing device providing the determined polarized wave. This is because a mutual interference is decreased in response to polarized wave characteristics of signals being different.

In other some embodiments, the router may identify at least one network providing device among a plurality of network providing devices, based on a capability of a terminal. For example, the router may identify a network providing device according to the support or non-support of a BLE function of the terminal. Also, for example, the router may identify a network providing device according to WLAN related capability information of the terminal. As an example, a required performance index may be varied according to a version of Wi-Fi of a WLAN supportable by the terminal, so the router may identify a network providing device according to the type of a Wi-Fi network that is being serviced to the terminal.

The router may be connected with the identified network providing device. The router may access a cellular network, via the identified network providing device. For example, the router may be connected with the network providing device by a wireless LAN, and be connected to a 5G network through the network providing device.

Figure 3:
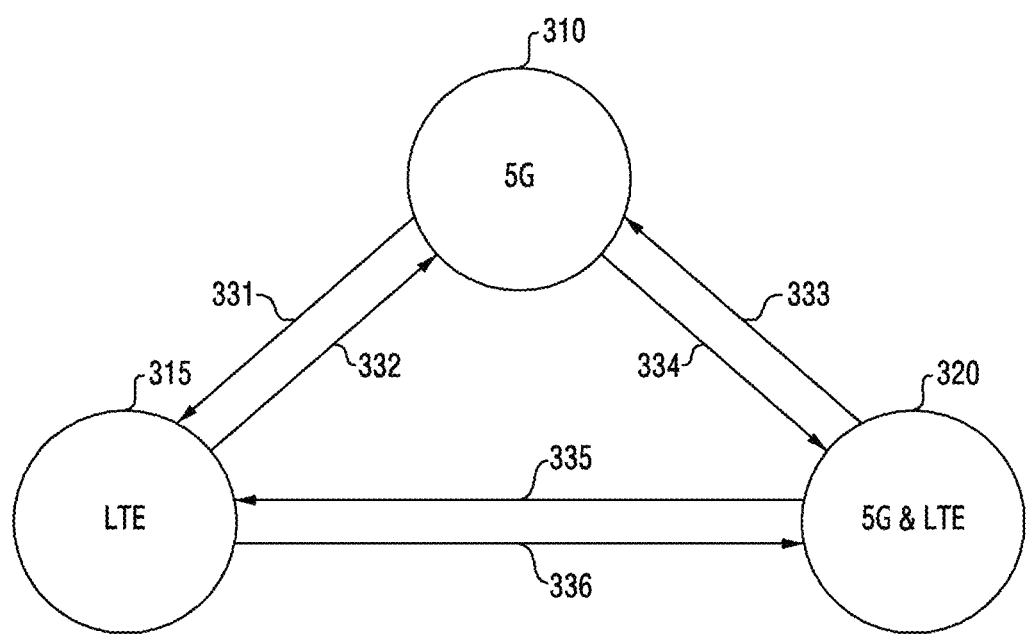
FIG. 3 illustrates a mode change of a backhaul link according to various embodiments of the present disclosure.

FIG. 3 illustrates a mode change of a backhaul link according to various embodiments of the present disclosure. Various modes of a backhaul interface may be defined according to the type of the backhaul link. The backhaul interface may mean a backhaul link configuring module for accessing a network (e.g., a 5G network or an LTE network).

Referring to FIG. 3, the backhaul interface modes may include a 5G mode 310, an LTE mode 315, and a 5G plus LTE mode 320. In response to the backhaul interface mode being set as the 5G mode 310, the router may configure a first backhaul link for accessing through a 5G network. In response to the backhaul interface mode being set as the LTE mode 315, the router may configure a second backhaul link for accessing through an LTE network. In response to the backhaul interface mode being set as the 5G plus LTE mode 320, the router may configure both the first backhaul link for accessing through the 5G network and the second backhaul link for accessing through the LTE network.

The backhaul interface mode may be changed. The backhaul interface mode may be changed on the basis of a channel state of the 5G network, a quality of a link between the network providing device and the router, a characteristic of a packet flow, a load of a currently set mode, user's setting, etc. According to various embodiments, a change between the aforementioned three modes may be divided into six types. According to each type, a condition for mode change may be determined, and signaling between the router and the network providing device dependent on the mode change may be defined.

In a first type 331, the backhaul link may be changed from the 5G mode to the LTE mode. At this time, a first condition for the first type 331 may be defined. The first condition may include a condition for releasing 5G connection.

In a second type 332, the backhaul link may be changed from the LTE mode to the 5G mode. At this time, a second condition for the second type 332 may be defined. The second condition may include a condition for establishing 5G connection.

In a third type 333, the backhaul link may be changed from the 5G plus LTE mode to the 5G mode. At this time, a third condition for the third type 333 may be defined. The third condition may include a condition for maintaining 5G connection and a condition for releasing LTE connection.

In a fourth type 334, the backhaul link may be changed from the 5G mode to the 5G plus LTE mode. At this time, a fourth condition for the fourth type 334 may be defined. The fourth condition may include a condition for maintaining 5G connection and a condition for adding LTE connection.

In a fifth type 335, the backhaul link may be changed from the 5G plus LTE mode to the LTE mode. At this time, a fifth condition for the fifth type 335 may be defined. The fifth condition may include a condition for releasing 5G connection.

In a sixth type 336, the backhaul link may be changed from the LTE mode to the 5G plus LTE mode. At this time, a sixth condition for the sixth type 336 may be defined. The sixth condition may include a condition for establishing 5G connection.

Below, the present disclosure describes operations of the router or the network providing device of various embodiments, on the basis of the three backhaul interface modes and the six mode change types. However, the present disclosure does not exclude links other than the LTE network and the 5G network. It is undoubted that the backhaul link may additionally consider Ethernet wired connection or a separate mobile network system such as a 4G communication system (e.g., WiMAX), a 3G communication system (e.g., WCDMA), or a 2G communication system (e.g., GSM or CDMA), etc.

In describing embodiments of the present disclosure, it may be assumed that a channel state of an LTE communication system is good. However, in accordance with an embodiment, a cell is measured on the LTE network by the router or the network providing device and accordingly to this, the addition or deletion of an LTE backhaul link may be performed as well.

Figure 4:
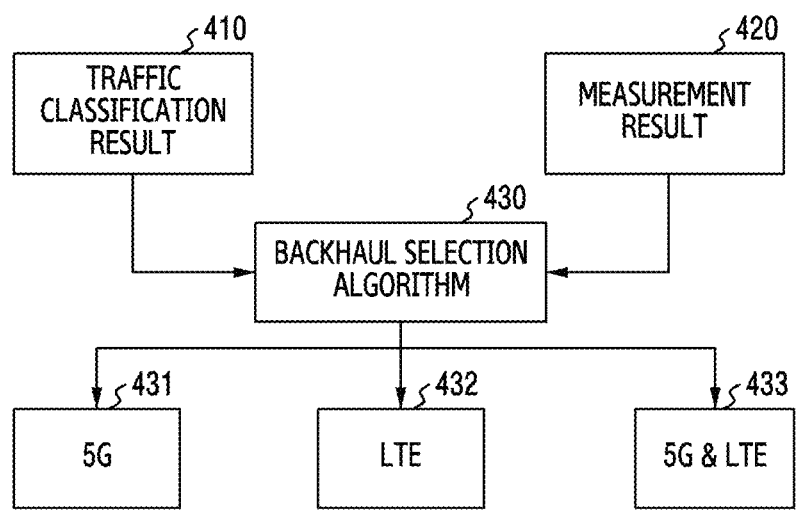
FIG. 4 illustrates an example of backhaul selection according to various embodiments of the present disclosure.

FIG. 4 illustrates an example of backhaul selection according to various embodiments of the present disclosure.

Referring to FIG. 4, a backhaul link may be determined based on a traffic classification result 410 and a measurement result 420. According to various embodiments, to support a 5G network, the backhaul link may be determined by the router and the determined network providing device. Also, according to other embodiments, the backhaul link may be directly determined in the router as well. The traffic classification result 410 may include a result of a per-packet-flow classification operation of the traffic classifying module 210 of FIG. 2A and FIG. 2B. The measurement result 420 may include a 5G network measurement result of the link monitoring module 223 of FIG. 2A and FIG. 2B or a link measurement result between the router and the network providing device.

A backhaul selection algorithm 430 for determining a backhaul link to access with inputting the traffic classification result 410 and the measurement result 420 may be defined. The backhaul selection algorithm 430 may be determined by a characteristic of a packet flow. For example, in response to it being required that a corresponding packet flow of the traffic classification result 410 is supported only by a 5G communication system, the backhaul selection algorithm 430 may select a backhaul link not to access an LTE network. The backhaul selection algorithm 430 may be determined by a channel state of a 5G network. For example, in response to a channel quality of the 5G network being lower than a threshold as the measurement result 420, the backhaul selection algorithm 430 may select a backhaul link to access the LTE network.

The network providing device may select, as a backhaul interface mode for a backhaul link that will be configured for a corresponding packet flow, one of a 5G mode 431, an LTE mode 432, and a 5G plus LTE mode 433, through the backhaul selection algorithm 430.

Figure 5:
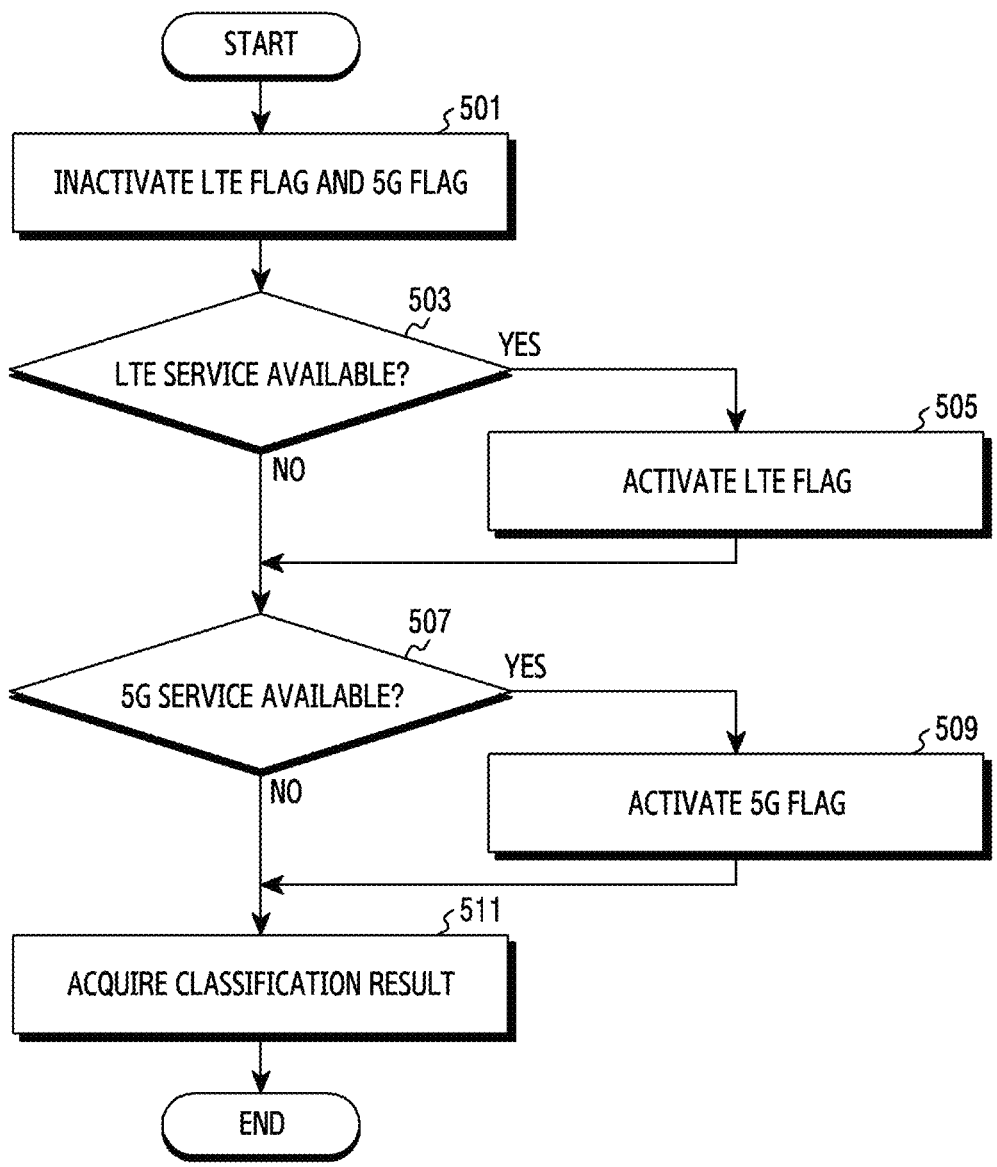
FIG. 5 illustrates an operation flow of a router for traffic classification according to various embodiments of the present disclosure.

FIG. 5 illustrates an operation flow of a router for traffic classification according to various embodiments of the present disclosure. Through the traffic classification, the traffic classification result 410 of FIG. 4 may be acquired. As illustrated in FIG. 2A and FIG. 2B, the traffic classification may be carried out by the router by using the traffic classifying module 210. The router may distinguish various conditions in order to determine a communication related characteristic of a packet flow. Below, FIG. 5 exemplifies two conditions for distinguishing the yes or no of an LTE communication system and the yes or no of a 5G communication system.

Referring to FIG. 5, in step 501, the router may inactivate both an LTE flag and a 5G flag. That is, the router may initialize a communication related characteristic of a packet flow. The traffic classification of FIG. 5 may be performed on a per-packet-flow basis. The router may inactivate both the LTE flat and 5G flag of the packet flow.

In step 503, the router may determine whether an LTE service of the packet flow is available. To determine whether the LTE service is available, various conditions may be utilized. In some embodiments, the router may determine whether a stability required for the packet flow is equal to or is greater than a reference value. Here, the stability may be measured based on a latency time, a guaranteed data rate (e.g., a guaranteed bit rate (GBR)), a radio link failure (RLF) generation frequency, etc. In other some embodiments, the router may determine whether a bandwidth required for the packet flow is within a range supportable by LTE.

In step 505, the router may activate the LTE flag. To represent that the packet flow can be provided through the LTE network, the router may activate the LTE flag of the packet flow.

In step 507, the router may determine whether a 5G service is available. In some embodiments, the router may determine whether a data rate required for the packet flow is fulfilled with a speed supportable by the 5G network. In other some embodiments, the router may determine whether a latency required for the packet flow satisfies a condition required for the 5G network.

In step 509, the router may activate the 5G flag. To represent that the packet flow can be provided through the 5G network, the router may activate the 5G flag of the packet flow.

In step 511, the router device may acquire the classification result. The classification result may be determined based on the 5G flag and LTE flag of the corresponding packet flow. The classification result may be determined based on whether the corresponding packet flow is serviceable through the 5G network and whether the corresponding packet flow is serviceable through the LTE network.

Figure 6:
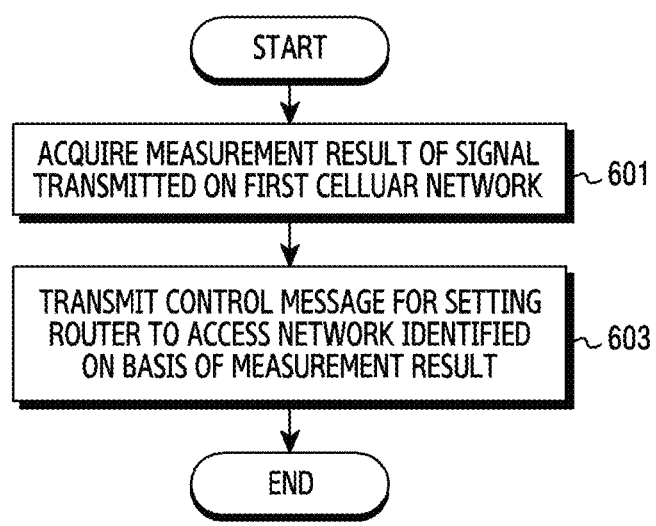
FIG. 6 illustrates an operation flow of a network providing device for adaptively configuring a backhaul link according to various embodiments of the present disclosure.

FIG. 6 illustrates an operation flow of a network providing device for adaptively configuring a backhaul link according to various embodiments of the present disclosure. The network providing device is communication equipment for servicing a 5G network, and exemplifies the network providing device 140 of FIG. 1.

Referring to FIG. 6, in step 601, the network providing device may acquire the measurement result of a signal transmitted on a first cellular network. A communication module included in the network providing device may support the first cellular network. The first cellular network may be a 5G cellular network. The first cellular network may include an NR communication system of 3GPP as a communication system supporting mmWave. As an example, the NR communication system may include a beamforming system for mmWave in a frequency range 2 (FR2). Also, as an example, the NR communication system may include a 5G system for a frequency band of an FR1 as well.

In step 603, the network providing device may transmit, to a router, a control message for setting the router to access a cellular network identified based on the measurement result. Here, the router may be equipment for providing Internet access to client devices through wired connection using Ethernet or wireless connection using a wireless LAN.

The network providing device may provide a control message on the basis of the measurement result. The control message may be a message for determining the type of a backhaul link that will be configured by the router. In some embodiments, the network providing device may identify the backhaul link which will be configured by the router on the basis of the measurement result. The network providing device may identify the backhaul link which will be configured by the router for the sake of a packet flow, based on the classification result of the corresponding packet flow and the measurement result of a first cellular network. Backhaul selection for identifying the backhaul link is described through FIG. 7. In other some embodiments, the network providing device may provide a control message including information for identifying the backhaul link that will be configured, to the router. Thereafter, the router receiving the control message may identify a backhaul link for accessing a cellular network. For example, the control message may include priority order per flow of each communication system (for example, a 5G communication system or an LTE communication system), or include a quality metric for each communication system.

Figure 7:
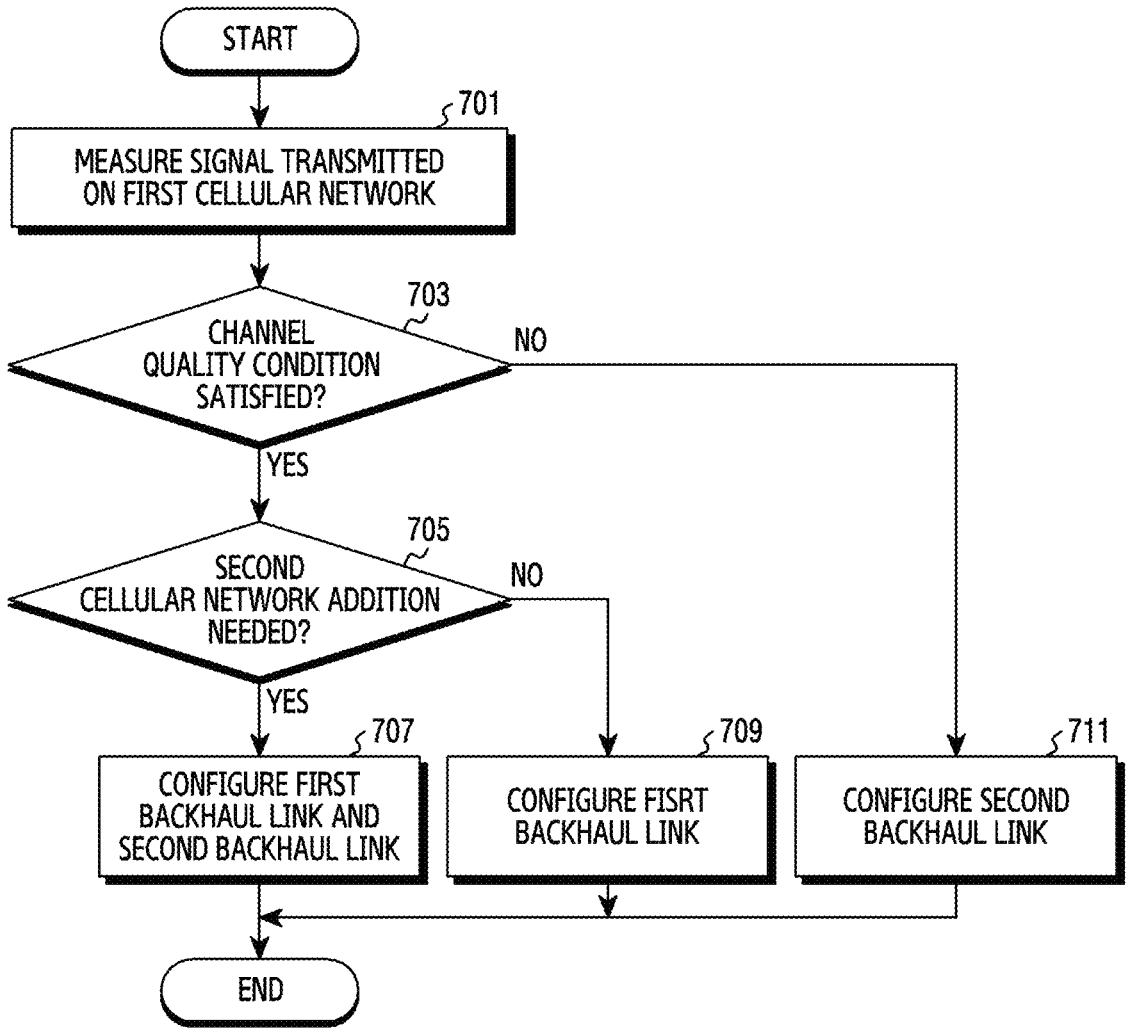
FIG. 7 illustrates an operation flow of a network providing device for identifying a backhaul link according to various embodiments of the present disclosure.

FIG. 7 illustrates an operation flow of a network providing device for identifying a backhaul link according to various embodiments of the present disclosure. The network providing device is communication equipment for servicing a 5G network, and exemplifies the network providing device 140 of FIG. 1.

Referring to FIG. 7, in step 701, the network providing device may measure a signal transmitted by a first cellular network. For example, the network providing device may measure the signal, to determine a channel quality. Here, the channel quality is information representing a channel state between the network providing device and a base station (e.g., gNB) providing the first cellular network, and may be measured based on a reference signal, a synchronization signal, etc. A metric representing the channel quality may be at least one of BRSRP, RSRQ, RSSI, SINR, CINR, SNR, EVM, BER, and BLER.

In step 703, the network providing device may determine whether a channel quality condition is satisfied. The network providing device may determine whether the channel quality is sufficiently high as a result of a channel measured in step 701. The network providing device may determine whether the channel quality condition is satisfied, through whether the channel quality is equal to or is greater than a reference value in response to the channel quality being a metric related with a signal strength, or through whether the channel quality is less than a threshold in response to the channel quality being a metric related with an error rate.

In some embodiments, the channel quality condition may further include not only a condition for a channel between the network providing device and the base station but also a condition for a channel between the network providing device and the router. For example, in response to a link between the router and the network providing device being a wireless link, not wired, the channel quality condition may include that a channel quality of the wireless link satisfies a threshold or more. As an example, the network providing device may determine whether a link equal to or greater than a specific quality can be formed with the router through a Wi-Fi interface. The network providing device may determine that the condition of step 703 is not fulfilled until both the measurement result of the signal of step 701 and the quality condition between the router and the network providing device are satisfied.

In response to the channel quality condition being satisfied, the network providing device may perform step 705. In response to the channel quality condition not being satisfied, the network providing device may perform step 711.

In step 705, the network providing device may determine whether the addition of a second cellular network is needed. Whether the addition of the second cellular network is needed may be determined according to whether a currently serviced packet flow can be sufficiently serviced through the first cellular network. For example, in response to it being difficult to satisfy a condition required for a corresponding packet service with only the first cellular network, the network providing device may determine that the addition of the second cellular network is needed in order to form an additional access link in the router. In response to it being determined that the addition of the second cellular network is needed, the network providing device may perform step 707. In response to it being determined that the addition of the second cellular network is not needed, the network providing device may perform step 709.

In step 707, the network providing device may configure a first backhaul link and a second backhaul link. In detail, the network providing device may identify the first backhaul link (e.g., a 5G mode) of the first cellular network and the second backhaul link (e.g., an LTE mode) of the second cellular network, as a backhaul link that will be configured by the router. In other words, as distinguishing that a channel quality with a current base station satisfies the channel quality condition, and the addition of the second cellular network is needed, the network providing device may configure a plurality of backhaul links, i.e., the first backhaul link and the second backhaul link.

In step 709, the network providing device may configure the first backhaul link. In detail, the network providing device may identify the first backhaul link (e.g., 5G mode) of the first cellular network, as the backhaul link that will be configured by the router. In other words, as distinguishing that the channel quality with the current base station satisfies the channel quality condition, and the addition of the second cellular network is not needed, the network providing device may configure one backhaul link, i.e., the first backhaul link that is based on the first cellular network.

In step 711, the network providing device may configure the second backhaul link. In detail, the network providing device may identify the second backhaul link (e.g., LTE mode) of the second cellular network, as the backhaul link that will be configured by the router. In other words, as the channel quality with the current base station does not satisfy the channel quality condition, the network providing device configures one backhaul link, i.e., the second backhaul link that is based on the second cellular network. That is, the network providing device may use the second cellular network, because the second cellular network has a relatively more stable characteristic compared to the first cellular network.

Though not illustrated in FIG. 7, the network providing device may transmit a control message for notifying the identified backhaul link, to the router. Thereafter, the router may configure the backhaul link through the corresponding control message. As an example, in response to the control message indicating a 5G backhaul network, the router may perform communication with a 5G base station via the network providing device through a Wi-Fi network. As another example, in response to the control message indicating an LTE backhaul network, the router may perform communication with an LTE base station through an LTE modem.

Figure 8:
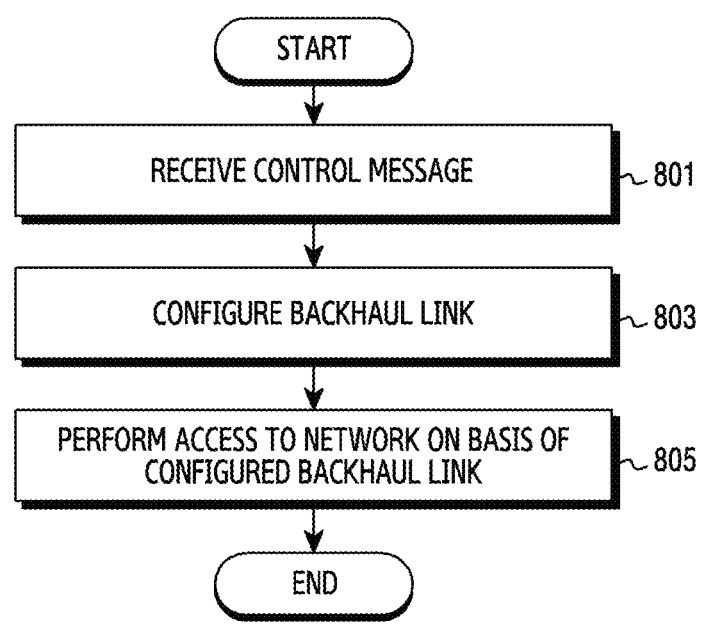
FIG. 8 illustrates an operation flow of a router for configuring a backhaul link according to various embodiments of the present disclosure.

FIG. 8 illustrates an operation flow of a router for configuring a backhaul link according to various embodiments of the present disclosure. The router is equipment for accessing a network through a 5G network or LTE network and providing Internet connection to client devices, and exemplifies the router 130 of FIG. 1.

Referring to FIG. 8, in step 801, the router may receive a control message from a network providing device. Here, the control message is a message for configuring a backhaul link of the router, and may include information for indicating a backhaul link suitable to a corresponding packet flow or identifying the suitable backhaul link. The control message may be a message for identifying at least one of a first cellular network and a second cellular network.

In step 803, the router may configure the backhaul link of the router on the basis of the control message. In some embodiments, the router may identify a backhaul interface mode as a 5G mode. The router may configure the first backhaul link for accessing a 5G base station (e.g., gNB). In other some embodiments, the router may identify the backhaul interface mode as an LTE mode. The router may configure the second backhaul link for accessing an LTE base station (e.g., eNB). In other some embodiments, the router may identify the backhaul interface mode as a 5G plus LTE mode. The router may configure the first backhaul link for accessing a 5G network and the second backhaul link for accessing an LTE network.

In step 805, the router may perform access to a network according to the configured backhaul link. In some embodiments, in response to the first backhaul link being configured, the router may be connected with the 5G base station via the network providing device. In other some embodiments, in response to the second backhaul link being configured, the router may be connected with the LTE base station. In other some embodiments, in response to the first backhaul link and the second backhaul link all being configured, the router may be connected with the 5G base station via the network providing device and be directly connected with the LTE base station through a wireless network. At this time, in accordance with an embodiment, two base stations may be set as dual connectivity. That is, the first backhaul link and the second backhaul link may be configured as dual connectivity.

FIG. 6 to FIG. 8 depict the operations of the network providing device and the router for determining and configuring the backhaul link for the router. Below, FIG. 9 to FIG. 14 depict operations of the network providing device and the router of the backhaul link change type mentioned in FIG. 3.

Figure 9:
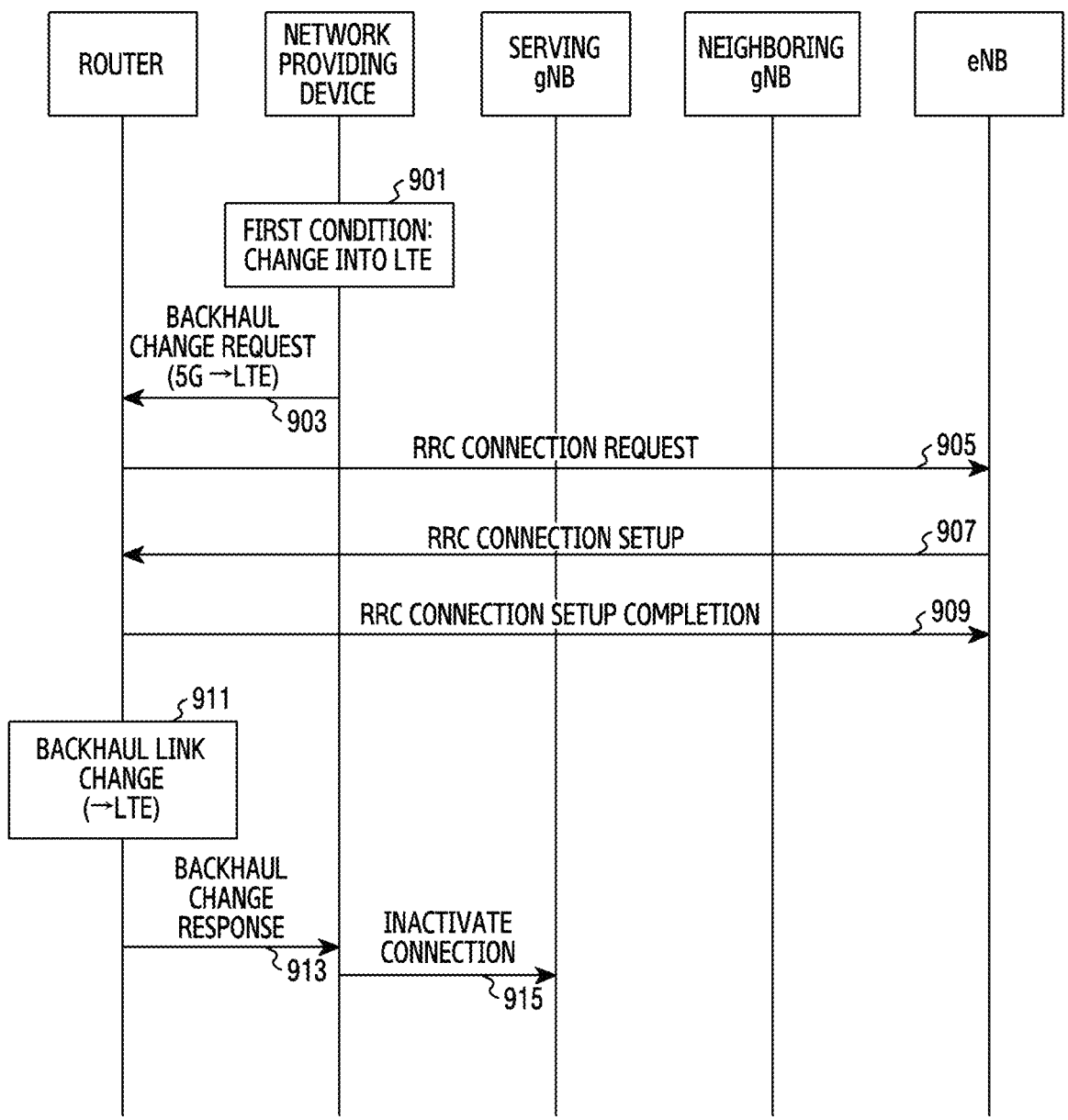
FIG. 9 illustrates a signal flow for a backhaul link change of a first type according to various embodiments of the present disclosure.

FIG. 9 illustrates a signal flow for a backhaul link change of a first type according to various embodiments of the present disclosure. Here, the first type exemplifies the first type 331 of FIG. 3. Through operations of FIG. 9, the backhaul link may be changed from a 5G backhaul link to an LTE backhaul link.

Referring to FIG. 9, in step 901, the network providing device may determine that a first condition is satisfied. The network providing device may be equipment for providing a wireless access of a 5G communication system. The network providing device may determine the satisfaction or non-satisfaction of the first condition, based on a traffic state in a 5G network and a state of a first backhaul link (i.e., a 5G backhaul link) providing access to the current 5G network. The state of the first backhaul link may include at least one of a link state between the router and the network providing device, and a channel state between the network providing device and the 5G network. Here, the channel state between the network providing device and the 5G network may include a channel state with not only a serving cell (or a serving base station (e.g., serving gNB)) connected with the current network providing device but also a neighboring cell (or a neighboring base station (e.g., neighboring gNB)). This is because it is desirable to maintain the first backhaul link, in response to handover between 5G cells being able to accomplish the channel quality equal to or greater than the reference value even though the serving cell fails to provide a channel quality equal to or greater than a reference vale.

In response to even any one of a channel quality of the 5G network or the link quality between the network providing device and the router failing to fulfill a required reference quality, the network providing device may determine that the first condition is satisfied. For example, in response to an RSRP value that is the channel quality of the 5G network being less than an RSRP threshold, the network providing device may determine that the first condition is satisfied. For another example, in response to an RSSI of a link of Wi-Fi between the router and the network providing device being equal to or being less than an RSSI reference value, the network providing device may determine that the first condition is satisfied. In some embodiments, in response to the link between the network providing device and the router being a wired link, a specific reliability and stability are guaranteed, so the distinguishing of a link quality between two nodes may be omitted as well.

In step 903, the network providing device may transmit a control message of requesting for a change of a backhaul link of the router, to the router. The control message may indicate a change of the backhaul link of the router, from a first backhaul link related with 5G to a second backhaul link related with LTE. In accordance with various embodiments, the control message may include a backhaul change policy, an LTE power management policy, a Wi-Fi power management policy, a per-flow backhaul link, etc. After receiving the control message, the router may establish a link for accessing an LTE network. In response to an LTE radio resource control (RRC) state being RRC idle, the router may reestablish RRC connection for the sake of transition to the RRC connection.

In step 905, the router may transmit an RRC connection request message to eNB. The eNB may receive the RRC connection request message. In step 907, the eNB may transmit an RRC connection setup message to the router. The router may receive the RRC connection setup message. In step 909, the router may transmit an RRC connection setup complete message to the eNB. Through step 905 to step 907, the router may form the connection for accessing the eNB.

In step 911, the router may change the configured backhaul link. The router may change the backhaul link, which is configured to access the 5G network, to access the LTE network. The router may change a backhaul interface mode into an LTE mode. By configuring the backhaul link as the second backhaul link, the router may access the LTE network.

In step 913, in response to the backhaul change request of step 903, the router may transmit a backhaul change response message to the network providing device. According to various embodiments, the backhaul change response message may include an LTE power management policy, a Wi-Fi power management policy, traffic state information, etc. The network providing device may receive the backhaul change response message. Through the backhaul change response message, the network providing device may confirm that a backhaul change has been completed.

In step 915, the network providing device may inactivate 5G connection. In accordance with an embodiment, the network providing device may transmit a control signal to a serving base station wherein an RRC connection state is set in an RRC INACTIVE mode in order to inactivate the 5G connection. Here, the serving base station is a base station supporting a 5G communication system, and may be a base station providing a service to the network providing device. In accordance with another embodiment, the network providing device may transmit a control signal to the serving base station wherein an RRC connection state is set in an RRC IDLE mode in order to inactivate the 5G connection. Though not illustrated in FIG. 9, in some embodiments, the network providing device may change a wireless LAN module into a power saving mode (PSM) state in compliance with a wireless LAN power management policy. This is because a utilization of the link between the router and the network providing device is decreased.

Unlike illustrated in FIG. 9, in response to there being a packet flow having to necessarily use 5G according to a serviced traffic state (e.g., a packet flow which requires a high data rate), the network providing device may set the router to add the second backhaul link as well, instead of changing from the first backhaul link to the second backhaul link.

Figure 10:
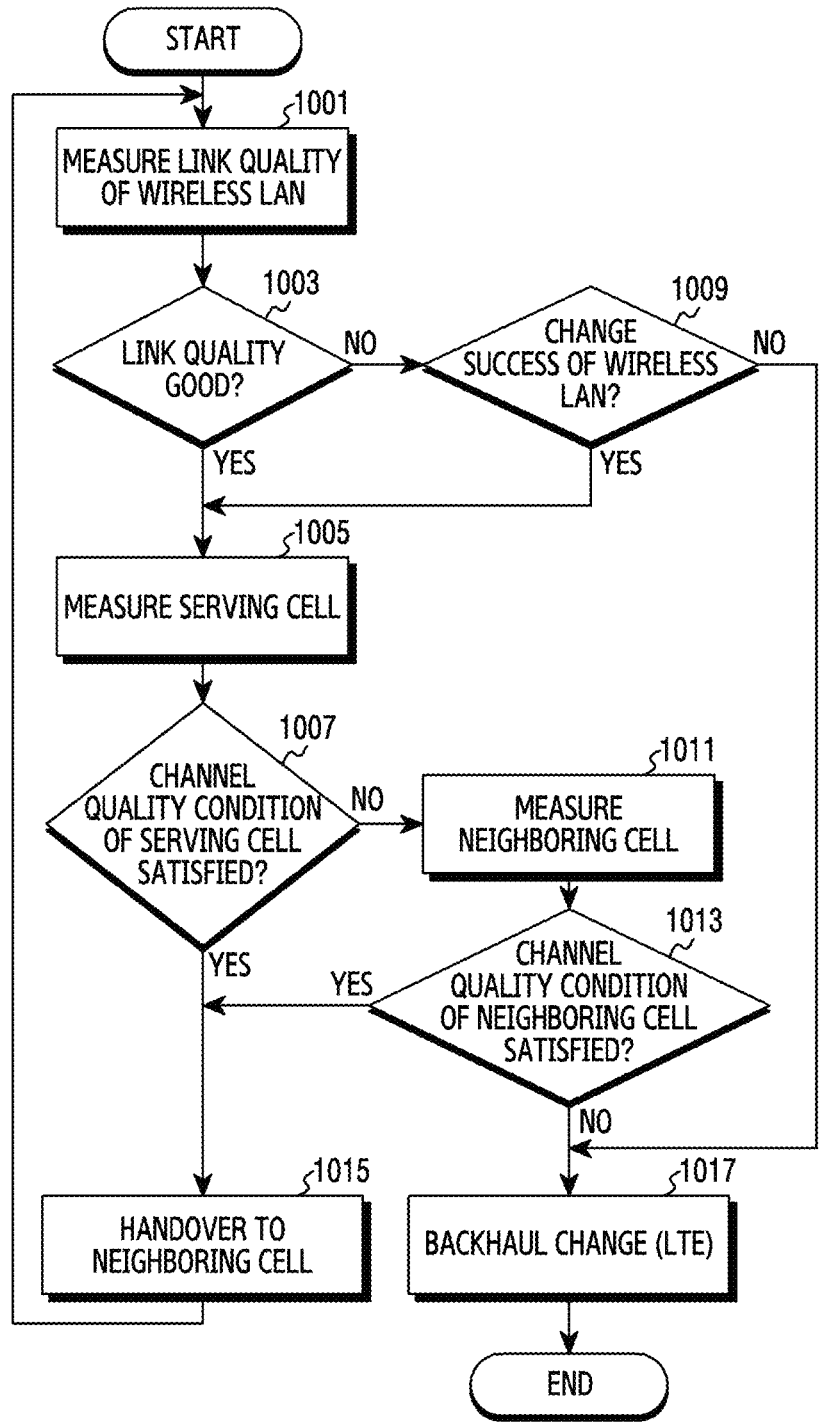
FIG. 10 illustrates an operation flow of a network providing device for distinguishing a backhaul link change of a first type according to various embodiments of the present disclosure.

FIG. 10 illustrates an operation flow of a network providing device for distinguishing a backhaul link change of a first type according to various embodiments of the present disclosure. The network providing device exemplifies the network providing device 140 of FIG. 1. FIG. 10 considers a situation in which a link between the network providing device determining a backhaul link and a router configuring the backhaul link is a wireless link. The wireless link may be formed through a wireless LAN (e.g., Wi-Fi). FIG. 10 depicts concrete operations for distinguishing the satisfaction or non-satisfaction of the first condition of step 901 of FIG. 9. A situation is that the current backhaul link of the router is set as the second backhaul link for accessing the LTE network.

Referring to FIG. 10, in step 1001, the network providing device may measure a link quality of a wireless LAN. The network providing device may measure the link quality with the router, i.e., a connection state of Wi-Fi. In accordance with an embodiment, the network providing device may periodically measure the link quality. In some embodiments, a metric representing the link quality may be at least one of BRSRP, RSRQ, RSSI, SINR, CINR, SNR, EVM, BER, and BLER. Also, in other some embodiments, the link quality may be determined considering, besides the metric, at least one of a packet loss rate, a channel utilization, a modulation and coding scheme (MCS), a channel occupancy time by interference, an expected throughput value, etc.

In step 1003, the network providing device may determine whether the link quality is good. The network providing device may determine whether the metric measured as the link quality in step 1001 fulfills a predefined range. The range of each metric may include a specific condition together with a maximum limit threshold or a minimum limit threshold. In accordance with an embodiment, the threshold and a condition of the corresponding threshold may be defined as in Table 3 below.

TABLE 3

| metric | threshold | condition |
|---|---|---|
| Packet loss rate (P1) | T1 | P1 > T1 |
| Channel utilization (P2) | T2 | P2 > T2 |
| MCS (P3) | T3 | P3 < T3 |
| Interference (P4) | T4 | P4 > T4 |
| Expected throughput (P5) | T5 | P5 < T5 |
| ... | ... | ... |

As a measurement value of a metric related with an error rate or interference is higher than the minimum limit threshold, or as a measurement value of a metric related with a signal strength or a goodness is lower than the maximum limit threshold, it may be determined that the link quality between the router and the network providing device is not good. In some embodiments, in response to set conditions among a plurality of conditions of Table 3 being all satisfied, the network providing device may determine that the link quality with the router is not good. In other some embodiments, in response to even one condition being satisfied, the network providing device may determine that the link quality with the router is not good as well.

In response to determining that the link quality with the router is good, the network providing device may perform step 1005. In response to determining that the link quality with the router is not good, the network providing device may perform step 1009.

In step 1005, the network providing device may measure a serving cell. Here, the serving cell may be a cell provided by a base station supporting a 5G communication system. By measuring a signal transmitted through the 5G network, the network providing device may determine a channel quality of the serving cell. Here, the signal may include at least one of a beam reference signal (BRS), a beam refinement reference signal (BRRS), a cell-specific reference signal (CRS), a channel state information-reference signal (CSI-RS), a demodulation-RS (DM-RS), a synchronization signal (SS), or an SS/physical broadcast channel (PBCH) block. Also, a metric for determining the channel quality may be at least one of BRSRP, RSRQ, RSSI, SINR, CINR, SNR, EVM, BER, and BLER. As an example, the network providing device may measure a metric for using an algorithm (e.g., NR EVENT A2) described on the NR communication standard.

In step 1007, the network providing device may determine whether a channel quality condition of the serving cell is fulfilled. The network providing device may determine whether the metric measured in step 1005 is equal to or is greater than a threshold. For example, after measuring an RSRP of a CSI-RS in step 1005, in response to the RSRP being equal to or being greater than an RSRP reference value, the network providing device may determine that the channel quality condition is fulfilled. For another example, after measuring an RSRP of an SS/PBCH block in step 1005, in response to the RSRP being less than the RSRP reference value, the network providing device may determine that the channel quality condition is not fulfilled. Also, for further example, the network providing device may determine whether the quality of the serving cell measured in step 1005 satisfies a measurement report condition (e.g., NR EVENT A2) defined on the standard.

In response to the channel quality condition for the serving cell being fulfilled, the network providing device may again perform step 1001. That is, the network providing device may maintain a currently set backhaul link of a router without changing. In response to the channel quality condition for the serving cell not being fulfilled, the network providing device may perform step 1011.

In step 1009, the network providing device may change a wireless LAN. Here, changing the wireless LAN may mean changing a channel of the wireless LAN between the network providing device and the router or a band of the wireless LAN. In response to the link quality between the network providing device and the router not being good, there is a problem in servicing through a current channel and a current band, so the network providing device needs to change the wireless LAN into another channel or another band.

In response to a link quality of the changed wireless LAN being good, the network providing device may determine that the change succeeds. In response to determining the change success of the wireless LAN, the network providing device may perform step 1005. Because a stable link between the network providing device and the router is formed, it is profitable to distinguish a channel quality of the 5G network. In contrast, in response to the link quality of the changed wireless LAN still not being good, the network providing device may repeatedly change the wireless LAN. Thereafter, in response to link qualities for all of available channel candidates and band candidates not being good, the network providing device may determine a change failure of the wireless LAN. In response to determining the change failure of the wireless LAN, the network providing device may perform step 1017. This is because, because a stable link between the network providing device and the router is not formed, it is not profitable to distinguish the channel quality of the 5G network.

In step 1011, the network providing device may measure a neighboring cell. Because the channel quality of the serving cell providing a 5G communication system is low, the network providing device may measure the neighboring cell in order to find a cell of a high channel quality. The network providing device may measure a channel quality of the neighboring cell, by using a metric that is the same or similar to that of the serving cell measurement.

In step 1013, the network providing device may determine whether a channel quality condition of the neighboring cell is satisfied. At this time, the channel quality condition of the neighboring cell may be constructed identically with or differently from step 1007. According to various embodiments, the NR communication system defines NR event A3 or A4 for the sake of handover to the neighboring cell. Accordingly, the network providing device may determine whether the channel quality condition of the neighboring cell is satisfied, in a different condition from step 1007. For example, the network providing device may compare the channel quality of the serving cell and the channel quality of the neighboring cell, to determine the satisfaction or non-satisfaction of the channel quality condition of the neighboring cell. For another example, the network providing device may determine the satisfaction or non-satisfaction of the channel quality condition of the neighboring cell according to whether the channel quality of the neighboring cell is higher than a reference value.

In response to the channel quality condition of the neighboring cell being satisfied, the network providing device may perform step 1015. In response to the channel quality condition of the neighboring cell not being satisfied, the network providing device may perform step 1017.

In step 1015, the network providing device may perform handover to the neighboring cell. In some embodiments, to perform handover to the neighboring cell, the network providing device may transmit a measurement report (MR) on the neighboring cell to the current serving cell. Thereafter, the handover from the serving cell to the neighboring cell may be carried out according to a command of the serving cell. In other some embodiments, to trigger the handover, the network providing device may transmit an uplink signal to the neighboring cell. After the handover to the neighboring cell, the network providing device may again perform step 1001. The network providing device may maintain the currently set backhaul link of the router without changing.

In step 1017, the network providing device may determine a backhaul change. The network providing device may configure a second backhaul link for accessing through an LTE network. A backhaul interface mode may be an LTE mode. Because the current channel quality of the 5G network is lower than the reference value or the link quality with the router is not good, the network providing device may determine to change the backhaul link of the router from the first backhaul link to the second backhaul link. Though not illustrated in FIG. 10, after step 1017, the network providing device may transmit a control message for changing a configuration of the backhaul link of the router, to the router.

Figure 11:
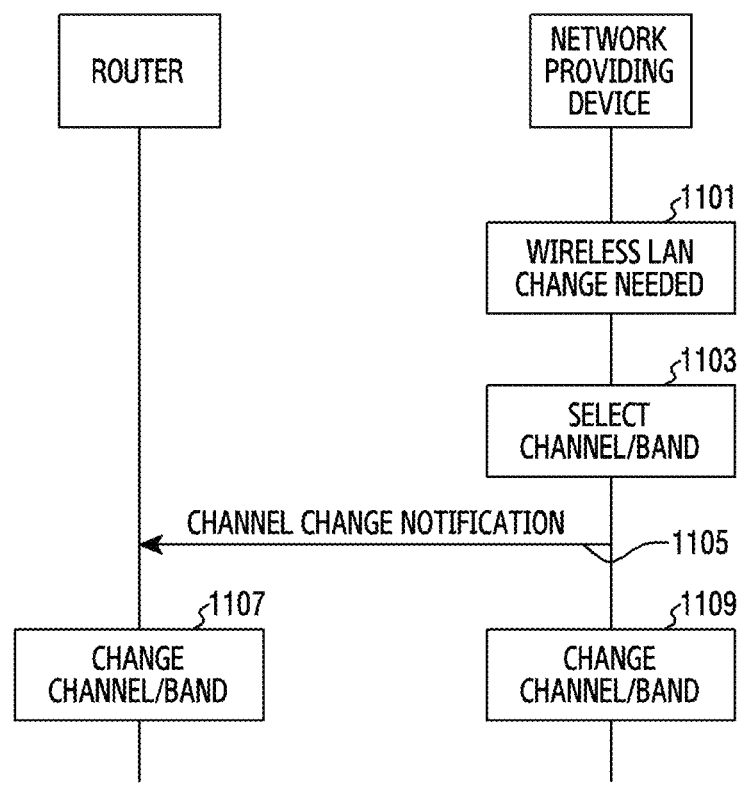
FIG. 11 illustrates a signal flow for a change of a Wi-Fi channel and band according to various embodiments of the present disclosure.

FIG. 11 illustrates a signal flow for a change of a Wi-Fi channel and band according to various embodiments of the present disclosure. The router exemplifies the router 130 of FIG. 1. The network providing device exemplifies the network providing device 140 of FIG. 1. A situation is described in which a current backhaul link of the router 130 is set as the first backhaul link for accessing the 5G network.

Referring to FIG. 11, in step 1101, the network providing device may determine that a wireless LAN change is needed. For example, in response to a state of a currently used Wi-Fi channel getting bad due to interference and a peripheral AP (e.g., a PER being equal to or being greater than a threshold), the network providing device may determine that the wireless LAN change is needed. A change of a Wi-Fi channel and band is triggered.

In step 1103, the network providing device may identify a channel and band capable of providing a good link quality. A band for a wireless LAN may include, for example, a 2.4 GHz band (2.4 GHz to 2.4835 GHz) and a 5 GHz band (5.15 GHz to 5.825 GHz). At each band, a plurality of channels may be defined. At the 2.4 GHz band, 14 channels may be defined. At the 5 GHz band, 24 channels may be defined. The network providing device may identify supportable band candidates and channel candidates, based on a wireless LAN interface installed in the network providing device and a wireless LAN interface installed in the router. The network providing device may identify a channel and band providing a link quality satisfying a specific condition among the identified channel candidates and band candidates. For example, the specific condition may include that a link quality (e.g., RSSI) of the wireless LAN is equal to or is greater than a threshold.

Though not illustrated in FIG. 11, in response to failing to identify the channel and band capable of providing the good link quality, the network providing device may provide a control message indicating to change the backhaul link into the first backhaul link for accessing the LTE network as in step 1017 of FIG. 10, and transmit the same to the router.

In step 1105, the network providing device may transmit a notification message indicating the channel change. For example, the network providing device may transmit a Wi-Fi channel switching announcement packet. The notification message may include information on the channel and band identified in step 1003.

In step 1107, the router may change a channel or band of the wireless LAN. The router may identify a channel providing a good link quality on the basis of the notification message. The router may change the channel into the identified channel. In response to the changed channel being a band different from a previous channel, the router may change the channel into the corresponding band.

In some embodiments, in response to the router not supporting a channel change protocol, the network providing device may, as in step 1009, change a channel or band of the wireless LAN. In the network providing device, the channel or band of the wireless LAN may be changed. The network providing device may change the channel into the channel identified in step 1003. In response to the changed channel being a band different from a previous channel, the network providing device may change the channel into the corresponding band. The network providing device may again perform association with the router through the changed channel. In accordance with an embodiment, step 1105 and step 1107 may be omitted.

Figure 12:
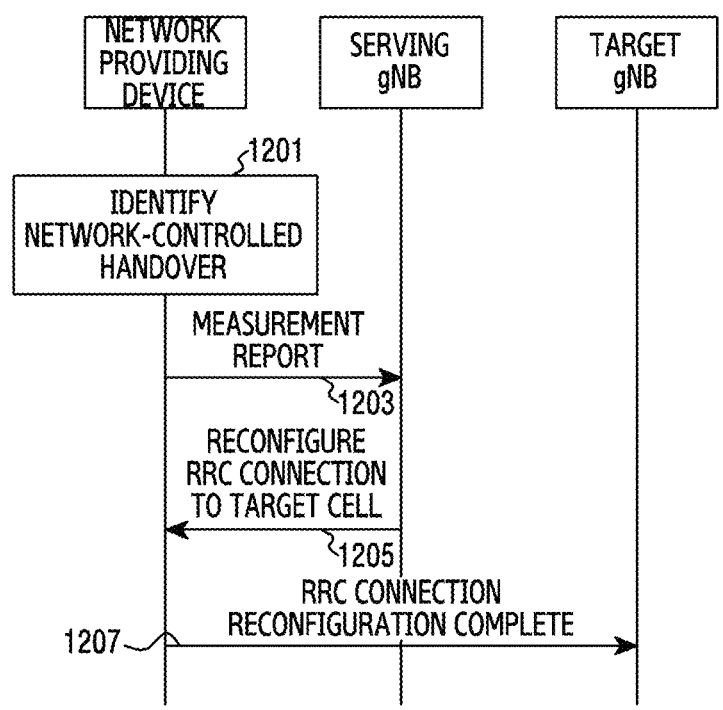
FIG. 12 illustrates a signal flow for network-controlled handover according to various embodiments of the present disclosure.

FIG. 12 illustrates a signal flow for network-controlled handover according to various embodiments of the present disclosure. The network-controlled handover indicates handover controlled by a network, i.e., handover by signaling of a serving base station to a target cell. Through FIG. 12, operations of step 1015 of FIG. 10 are described.

Referring to FIG. 12, in step 1201, the network providing device may determine network-controlled handover. The network providing device may acquire a measurement result on a neighboring cell, and determine that the measurement result satisfies a handover condition (e.g., the channel quality condition of step 1013 of FIG. 10).

In step 1203, the network providing device may provide a measurement report including the measurement result on the neighboring cell, to the serving base station (or a serving cell). The serving base station may receive the measurement report. The serving base station may determine handover of the network providing device, based on the measurement report.

In step 1205, the serving base station may transmit a reconfiguration message to the network providing device. The serving base station may transmit a reconfiguration message indicating handover to a target base station (or a target cell), to the network providing device. By receiving the reconfiguration message, the network providing device may identify the target base station.

In step 1207, the network providing device may transmit an RRC connection reconfiguration complete message to the target base station. The target base station receives the RRC connection reconfiguration complete message, whereby a handover procedure is terminated. By measuring a signal transmitted from the target base station, the network providing device may periodically measure a channel quality of a 5G network. The network providing device may identify a backhaul link of a router, based on the measurement result on the cell of the target base station, i.e., the target cell.

Figure 13:
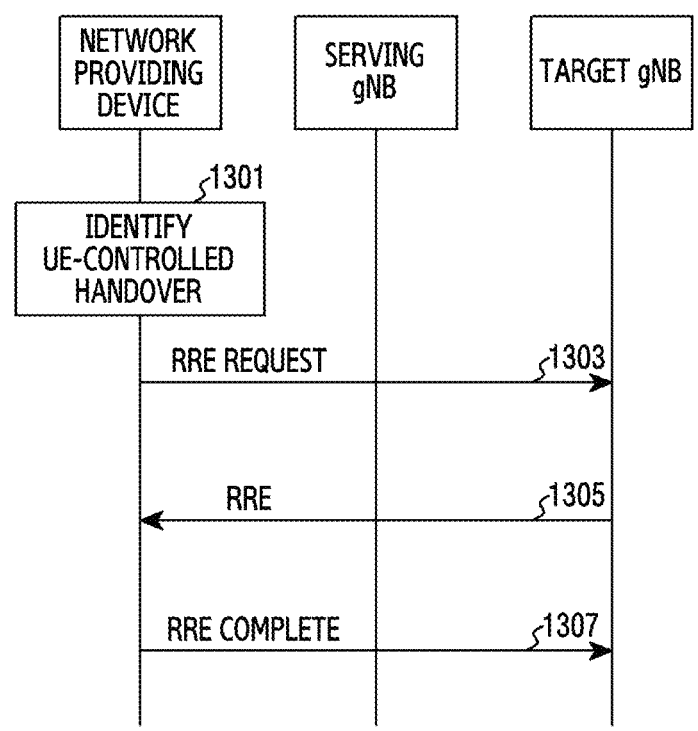
FIG. 13 illustrates a signal flow for UE-controlled handover according to various embodiments of the present disclosure.

FIG. 13 illustrates a signal flow for UE-controlled handover according to various embodiments of the present disclosure. The UE-controlled handover is handover controlled by a UE, and indicates handover which is performed from a serving cell to a target cell as the UE transmits an uplink signal to the target cell (or target base station). The network providing device is a UE device in view of a 5G network, and may perform the UE-controlled handover. Through FIG. 13, operations of step 1015 of FIG. 10 are described.

Referring to FIG. 13, in step 1301, the network providing device may determine UE-controlled handover. The network providing device may acquire a measurement result on a neighboring cell, and determine that the measurement result satisfies a handover condition (e.g., the channel quality condition of step 1013 of FIG. 10).

In step 1303, the network providing device may transmit an RRC connection reestablishment (RRE) request message to a target base station. Here, the target base station may be a base station providing the neighboring cell of step 1301. The network providing device may transmit the RRE request message to the target base station for the sake of RRC connection setup with the target base station. The target base station may receive the RRE request message.

In step 1305, the target base station may transmit an RRE message. In response to the RRE request message, the target base station may transmit the RRE message to the network providing device. By transmitting the RRE message, new RRC connection between the network providing device and the target base station may be established.

In step 1307, the network providing device may transmit an RRE complete message. The target base station receives the RRE complete message, whereby a handover procedure is terminated. By measuring a signal transmitted from the target base station, the network providing device may periodically measure a channel quality of a 5G network. The network providing device may identify a backhaul link of a router, based on a measurement result on a cell of the target base station, i.e., a target cell.

Figure 14:
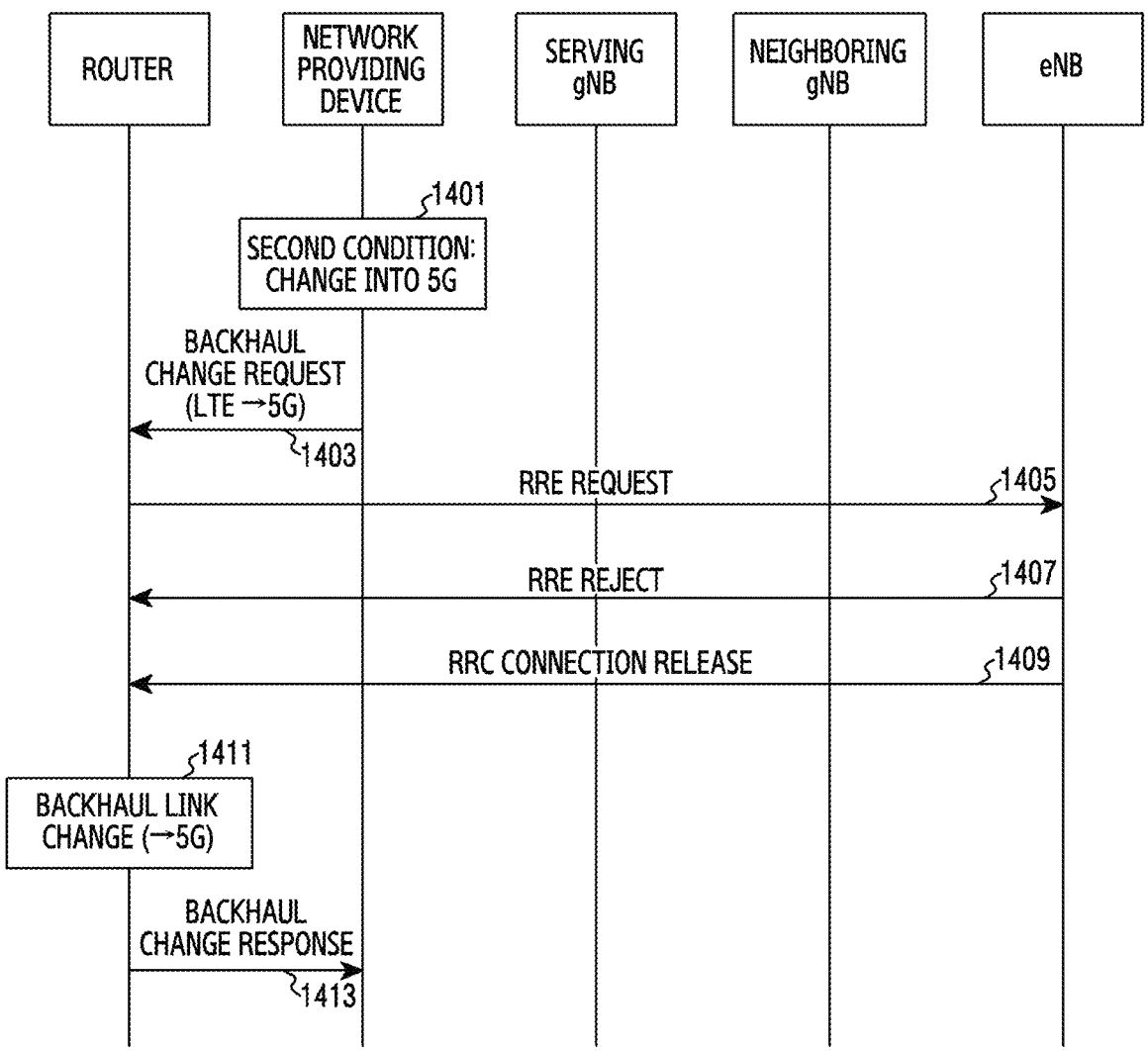
FIG. 14 illustrates a signal flow for a backhaul link change of a second type according to various embodiments of the present disclosure.

FIG. 14 illustrates a signal flow for a backhaul link change of a second type according to various embodiments of the present disclosure. Here, the second type exemplifies the second type 332 of FIG. 3. Through operations of FIG. 14, a backhaul link may be changed from an LTE backhaul link to a 5G backhaul link.

Referring to FIG. 14, in step 1401, the network providing device may determine that a second condition is satisfied. The network providing device may be equipment for providing a wireless access of a 5G communication system. The network providing device may determine the satisfaction or non-satisfaction of the second condition, based on a traffic state in the 5G network, a characteristic of a packet flow, and a state of a first backhaul link (i.e., the 5G backhaul link) providing access to the current 5G network. The state of the second backhaul link may include at least one of a link state between the router and the network providing device, and a channel state between the network providing device and the 5G network. A description of the link state and the channel state between the network providing device and the 5G network considered at the time of the backhaul link change of the first type in step 901 of FIG. 9 may be identically or similarly applied to step 1401.

In FIG. 9, a description has been made in which the first condition is satisfied in response to at least one of the channel quality of the 5G network or the link quality between the router and the network providing device not being good, but, in FIG. 14, inversely to the first condition, the second condition is satisfied in response to the channel quality and the link quality being all good. For example, in response to an RSRP value that is the channel quality of the 5G network being equal to or being greater than an RSRP threshold, and an RSSI of a link of Wi-Fi between the router and the network providing device exceeding an RSSI reference value, the network providing device may determine that the second condition is satisfied.

In step 1403, the network providing device may transmit a control message of requesting for a change of a backhaul link, to a router. The control message may indicate a change of a backhaul link of the router, from a second backhaul link related with LTE to a first backhaul link related with 5G. In accordance with various embodiments, the control message may include a backhaul change policy, an LTE power management policy, a Wi-Fi power management policy, a per-flow backhaul link, etc. After receiving the control message, the router may release a link for accessing an LTE network. In response to an LTE RRC state being RRC connected, RRC connection may be released for transition from an RRC state to an RRC IDLE mode.

In step 1405, the router may transmit an RRE message to eNB. The eNB may receive the RRE message. In step 1407, the eNB may transmit an RRE reject message to the router. The router may receive the RRE reject message. In step 1409, the eNB may transmit an RRC connection release message to the router. The router may receive the RRC connection release message. Through step 1405 to step 1409, the router may release RRC connection for accessing the LTE network.

In step 1411, the router may change the configured backhaul link. The router may change the backhaul link, which is configured to access LTE, to access the 5G network. The router may change a backhaul interface mode into a 5G mode. By configuring the backhaul link as the first backhaul link, the router may access the 5G network.

In step 1413, in response to the backhaul change request of step 1403, the router may transmit a backhaul change response message to the network providing device. According to various embodiments, the backhaul change response message may include an LTE power management policy, a Wi-Fi power management policy, traffic state information, etc. After receiving the backhaul change response, the network providing device may transmit a per-flow backhaul configuration packet. By receiving the backhaul change response message, the network providing device may confirm that a change of backhaul has been completed.

Unlike illustrated in FIG. 14, in response to there being a packet flow having to necessarily use LTE according to a serviced traffic state (e.g., a packet flow that requires a high service stability), the network providing device may set the router to add the first backhaul link as well, instead of changing the second backhaul link into the first backhaul link.

Figure 15:
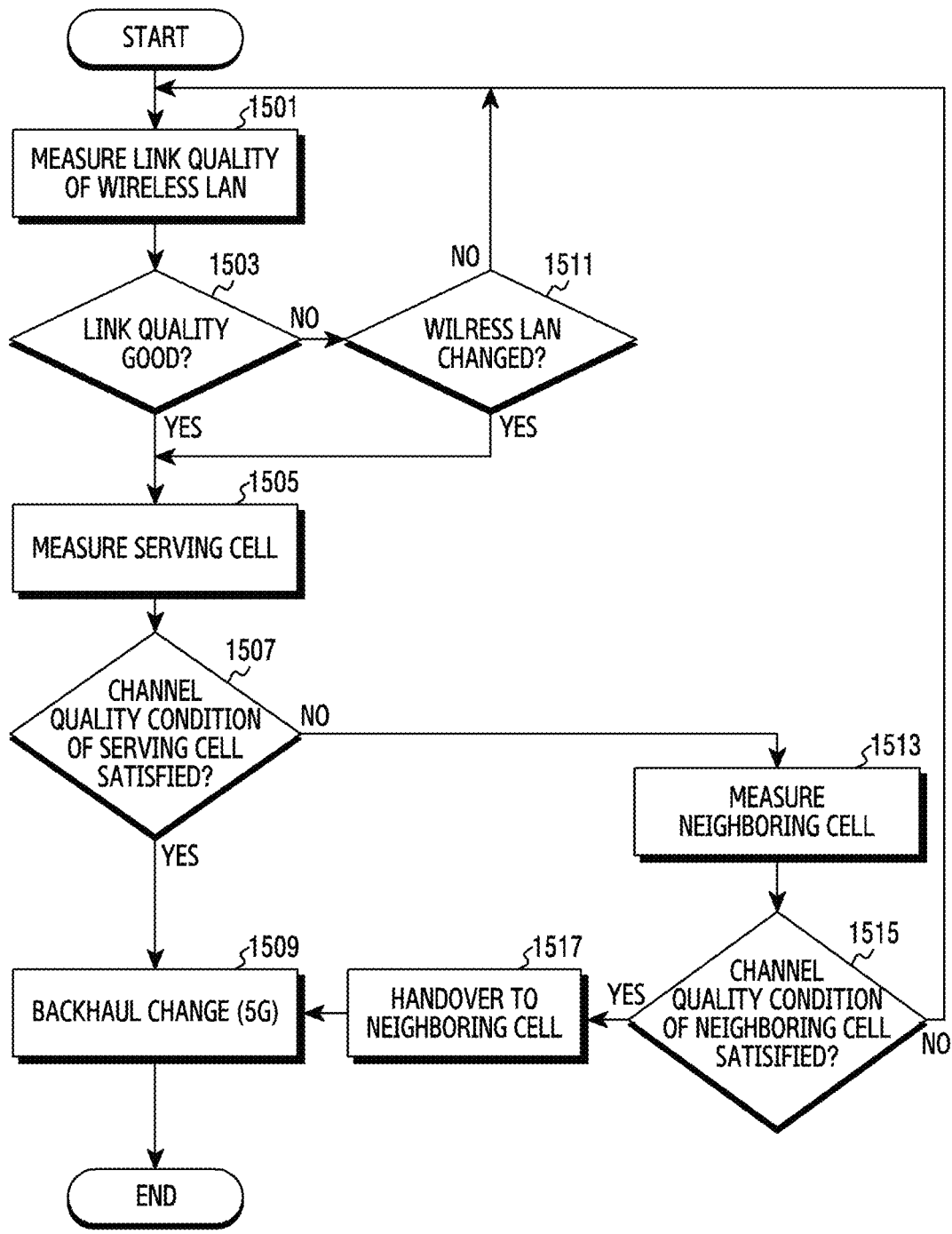
FIG. 15 illustrates an operation flow of a network providing device for a backhaul link change of a second type according to various embodiments of the present disclosure.

FIG. 15 illustrates an operation flow of a network providing device for a backhaul link change of a second type according to various embodiments of the present disclosure. The network providing device exemplifies the network providing device 140 of FIG. 1. FIG. 15 considers a situation in which a link between the network providing device identifying a backhaul link and a router configuring the backhaul link is a wireless link. The wireless link may be formed through a wireless LAN (e.g., Wi-Fi). FIG. 15 depicts concrete operations for distinguishing the satisfaction or non-satisfaction of the second condition of step 1401 of FIG. 14. It is a situation in which the current backhaul link of the router is set as the first backhaul link for accessing the 5G network.

Referring to FIG. 15, in step 1501, the network providing device may measure a link quality of a wireless LAN. The network providing device may measure the link quality with the router, i.e., a connection state of Wi-Fi. Step 1501 corresponds to step 1001 of FIG. 10 and thus, a detailed description of a repeated construction is omitted.

In step 1503, the network providing device may determine whether the link quality is good. Step 1503 corresponds to step 1003 of FIG. 10 and thus, a detailed description of a repeated construction is omitted. In response to determining that the link quality with the router is good, the network providing device may perform step 1505. In response to determining that the link quality with the router is not good, the network providing device may perform step 1511.

In step 1505, the network providing device may measure a serving cell. Here, the serving cell may be a cell provided by a base station supporting a 5G communication system. Although a backhaul interface mode is not a 5G mode, the network providing device may transmit and/or receive a signal through a 5G network. In some embodiments, in response to not being an RRC connection state in the 5G network, the network providing device may measure a 5G cell through an SS/PBCK block. Thereafter, the network providing device may establish RRC connection with a 5G base station through cell selection. Step 1505 corresponds to step 1005 of FIG. 10 and thus, a detailed description of a repeated construction is omitted.

In step 1507, the network providing device may determine whether a channel quality condition of the serving cell is fulfilled. Step 1507 corresponds to step 1007 of FIG. 10 and thus, a detailed description of a repeated construction is omitted.

In response to the channel quality condition for the serving cell being fulfilled, the network providing device may perform step 1509. That is, the network providing device may change the currently set backhaul link of the router. In response to the channel quality condition for the serving cell not being fulfilled, the network providing device may perform step 1513.

In step 1509, the network providing device may determine a backhaul change. The network providing device may configure a first backhaul link for accessing through the 5G network. The backhaul interface mode may be the 5G mode. Because a channel quality of the 5G network is higher than a reference value and the link quality with the router is good, the network providing device may determine to use the 5G communication system. The network providing device may determine to change the backhaul link of the router, from the second backhaul link to the first backhaul link. Though not illustrated in FIG. 15, after step 1509, the network providing device may transmit a control message for changing a configuration of the backhaul link of the router, to the router.

In step 1511, the network providing device may change a wireless LAN. Step 1511 corresponds to step 1009 of FIG. 10 and thus, a detailed description of a repeated construction is omitted. In response to determining a change success of the wireless LAN, the network providing device may perform step 1505. This is because a stable link between the network providing device and the router is formed, so it is profitable to distinguish a channel quality of the 5G network. In contrast, in response to a link quality of the changed wireless LAN still not being good, the network providing device may change the wireless LAN repeatedly. In response to determining a change failure of the wireless LAN, the network providing device may again perform step 1501. This is because the stable link between the network providing device and the router is not formed, so it is not profitable to distinguish the channel quality of the 5G network.

The network providing device may again perform step 1501 in order to maintain a configuration of the existing LTE related backhaul link.

In step 1513, the network providing device may measure a neighboring cell. Step 1513 corresponds to step 1011 of FIG. 10 and thus, a detailed description of a repeated construction is omitted.

In step 1515, the network providing device may determine whether a channel quality condition of the neighboring cell is satisfied. Step 1515 corresponds to step 1013 of FIG. 10 and thus, a detailed description of a repeated construction is omitted.

In response to the channel quality condition of the neighboring cell being satisfied, the network providing device may perform step 1517. In contrast, in response to the channel quality condition of the neighboring cell not being satisfied, the network providing device may again perform step 1501. Because there is not a cell capable of providing a stable link among 5G cells, the network providing device may maintain the backhaul link of the router as the second backhaul link (LTE network). Here, it may be assumed that an access link to the LTE network is a stabilized link.

In step 1517, the network providing device may perform handover to the neighboring cell. Step 1517 corresponds to step 1015 of FIG. 10 and thus, a detailed description of a repeated construction is omitted. Because the neighboring cell is a 5G cell providing the 5G network, the network providing device may perform step 1509 after performing the handover to the neighboring cell. Though not illustrated in FIG. 15, after step 1509, the network providing device may transmit, to the router, a control message for changing a configuration of the backhaul link of the router into a 5G backhaul link, i.e., the first backhaul link.

Figure 16:
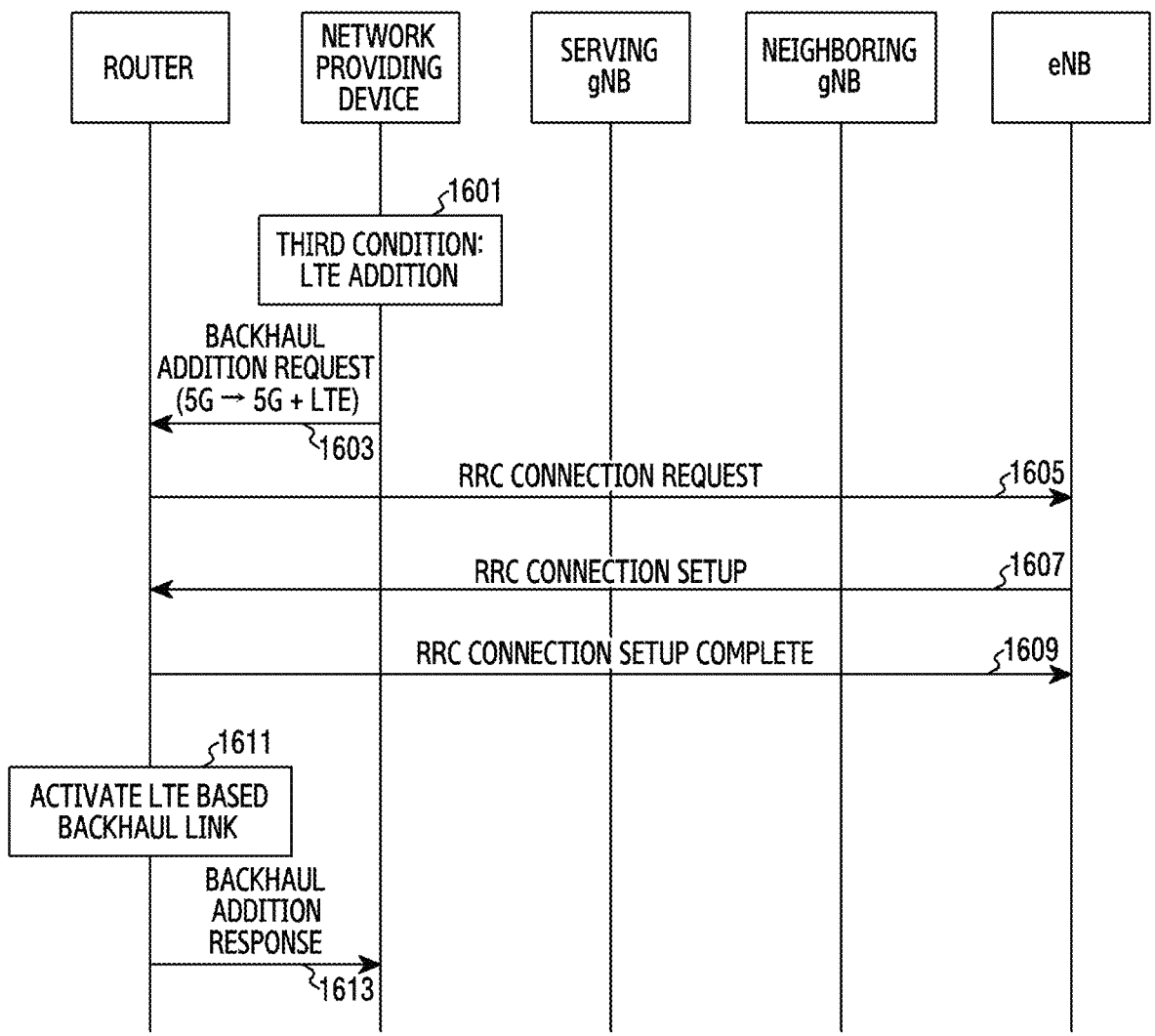
FIG. 16 illustrates a signal flow for a backhaul link change of a third type according to various embodiments of the present disclosure.

FIG. 16 illustrates a signal flow for a backhaul link change of a third type according to various embodiments of the present disclosure. Here, the third type exemplifies the third type 333 of FIG. 3. Through operations of FIG. 16, an LTE backhaul link may be added to a 5G backhaul link. A backhaul interface mode may be changed from a 5G mode to a 5G plus LTE mode.

Referring to FIG. 16, in step 1601, the network providing device may determine that a third condition is satisfied. The network providing device may be equipment for providing a wireless access of a 5G communication system. The network providing device may determine the satisfaction or non-satisfaction of the third condition, based on at least one of a traffic state in a 5G network, a characteristic of a packet flow, and a state of a first backhaul link (i.e., a 5G based backhaul link) providing access to the current 5G network. For example, in response to a packet flow newly added to the 5G backhaul link not being sufficient to be serviced to the current 5G based backhaul link, the network providing device may determine that the third condition is fulfilled. As an example, in response to it being difficult that a data rate required by the added packet flow is achieved with only the 5G based backhaul link, the network providing device may determine that the third condition is fulfilled. For another example, in response to the added packet flow being required to be serviced to the LTE based backhaul link, the network providing device may determine that the third condition is fulfilled. For further example, in response to a channel quality of the 5G network being decreased but a currently serviced flow being required to be serviced to the 5G based backhaul link, the network providing device may determine that the third condition is fulfilled.

In step 1603, the network providing device may transmit a control message of requesting for the addition of a backhaul link, to the router. The control message may indicate the addition of the second backhaul link related with LTE. In accordance with various embodiments, the control message may include information on a backhaul link that will be added, an LTE power management policy, a Wi-Fi power management policy, a per-flow backhaul link, etc. After receiving the control message, the router may establish a link for accessing an LTE network. In response to an LTE RRC state being RRC idle, the router may reestablish RRC connection for the sake of transition to the RRC connection.

In step 1605, the router may transmit an RRC connection request message to eNB. The eNB may receive the RRC connection request message. In step 1607, the eNB may transmit an RRC connection setup message to the router. The router may receive the RRC connection setup message. In step 1609, the router may transmit an RRC connection setup complete message to the eNB. Through step 1605 to step 1607, the router may form the connection for accessing the eNB.

In step 1611, the router may activate the LTE based backhaul link. That is, the router may additionally configure a backhaul link for accessing the LTE network besides the backhaul link configured to access the 5G network. The router may change a backhaul interface mode into a 5G plus LTE mode. By adding the second backhaul link, the router may access the LTE network.

In step 1613, in response to the backhaul addition request of step 1603, the router may transmit a backhaul addition response message to the network providing device. According to various embodiments, the backhaul addition response message may include an LTE power management policy, a Wi-Fi power management policy, traffic state information, etc. The network providing device may receive the backhaul addition response message. The network providing device may confirm that the addition of backhaul has been completed through the backhaul addition response message. After receiving the backhaul addition response message, the network providing device may transmit a packet for configuring a per-flow backhaul link.

Figure 17:
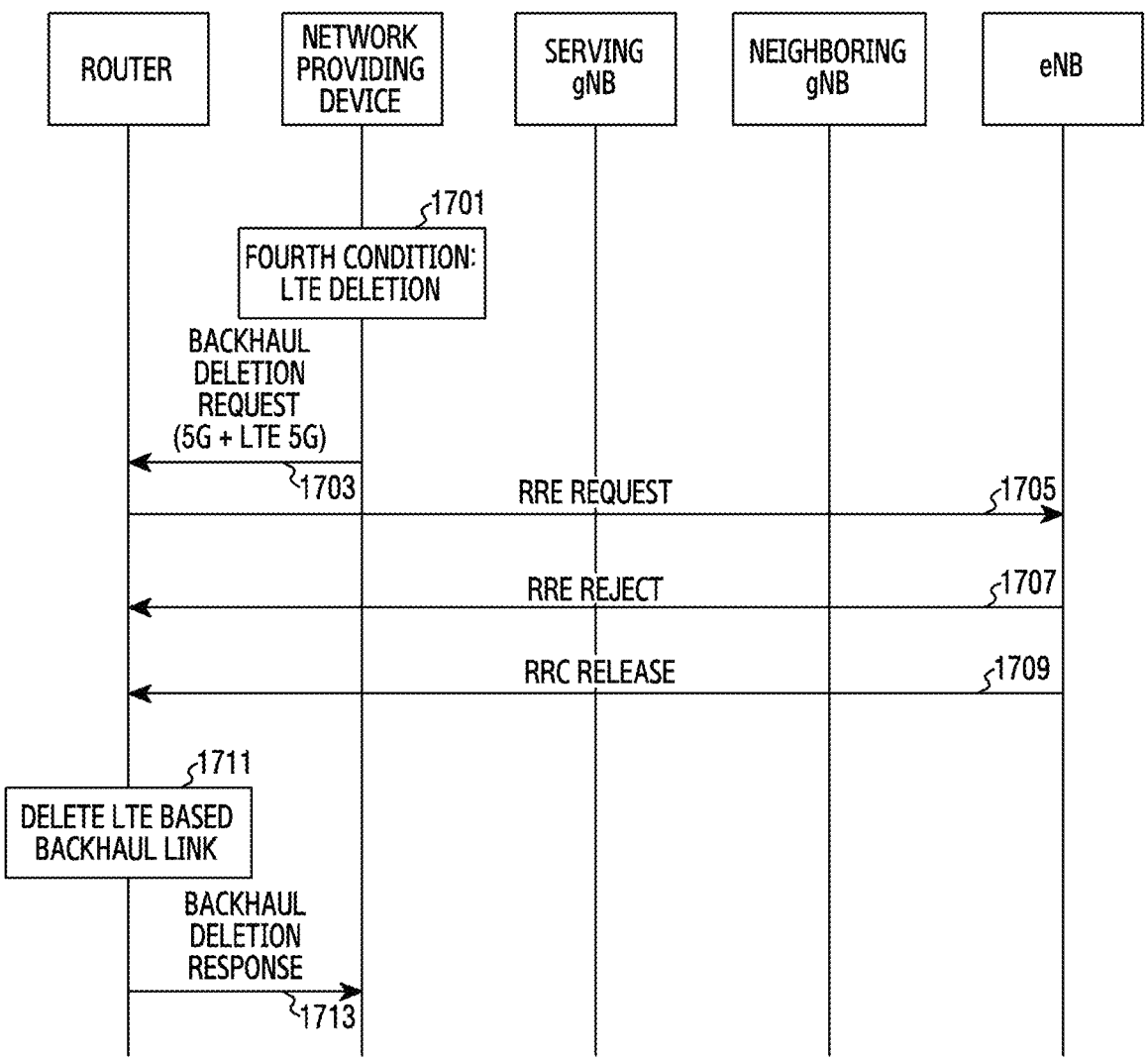
FIG. 17 illustrates a signal flow for a backhaul link change of a fourth type according to various embodiments of the present disclosure.

FIG. 17 illustrates a signal flow for a backhaul link change of a fourth type according to various embodiments of the present disclosure. Here, the fourth type exemplifies the fourth type 334 of FIG. 3. Through operations of FIG. 17, an LTE backhaul link may be deleted among a 5G backhaul link and the LTE backhaul link. A backhaul interface mode may be changed from a 5G plus LTE mode to a 5G mode.

Referring to FIG. 17, in step 1701, the network providing device may determine that a fourth condition is satisfied. The network providing device may be equipment for providing a wireless access of a 5G communication system. The network providing device may determine the satisfaction or non-satisfaction of the fourth condition, based on at least one of a traffic state in a 5G network, a characteristic of a packet flow, and a state of a first backhaul link (i.e., a 5G based backhaul link) providing access to the current 5G network. For example, in response to it being possible to process currently serviced packet flows with only the 5G based backhaul link, the network providing device may determine the satisfaction of the fourth condition. As an example, in response to service flows requiring the LTE based backhaul link being all terminated, the network providing device may determine the satisfaction of the fourth condition. For another example, in response to the LTE communication quality being decreased less than a threshold, the network providing device may determine the satisfaction of the fourth condition. At this time, the 5G based backhaul link is maintained, so it is premised to satisfy a state in which each of a link quality between the network providing device and the router and a channel quality of the 5G network is equal to or is greater than a specific reference value. A description of the link state and channel state of the 5G network mentioned in step 901 of FIG. 9 and step 1410 of FIG. 14 may be identically or similarly applied to step 1401.

In step 1703, the network providing device may transmit a control message of requesting for the deletion of a backhaul link, to the router. The control message may indicate the deletion of a second backhaul link related with LTE. In accordance with various embodiments, the control message may include information on a backhaul link that will be deleted, an LTE power management policy, a Wi-Fi power management policy, a per-flow backhaul link, etc. After receiving the control message, the router may release a link for accessing an LTE network. In response to an LTE RRC state being RRC connected, RRC connection may be released for transition from the RRC state to an RRC IDLE mode.

In step 1705, the router may transmit an RRE message to eNB. The eNB may receive the RRE message. In step 1707, the eNB may transmit an RRE reject message to the router. The router may receive the RRE reject message. In step 1709, the eNB may transmit an RRC connection release message to the router. The router may receive the RRC connection release message. Through step 1705 to step 1707, the router may release the RRC connection for accessing the LTE network.

In step 1711, the router may delete the LTE based backhaul link. The router may release, in the backhaul interface, the backhaul link configured to access LTE. The router may set a backhaul interface mode to a 5G mode. The router may configure only the first backhaul link as the backhaul link.

In step 1713, in response to the backhaul deletion request of step 1703, the router may transmit a backhaul deletion response message to the network providing device. According to various embodiments, the backhaul deletion response message may include an LTE power management policy, a Wi-Fi power management policy, traffic state information, etc. After receiving the backhaul deletion response, the network providing device may transmit a per-flow backhaul configuration packet. By receiving the backhaul deletion response message, the network providing device may confirm that the deletion of backhaul has been completed.

Figure 18:
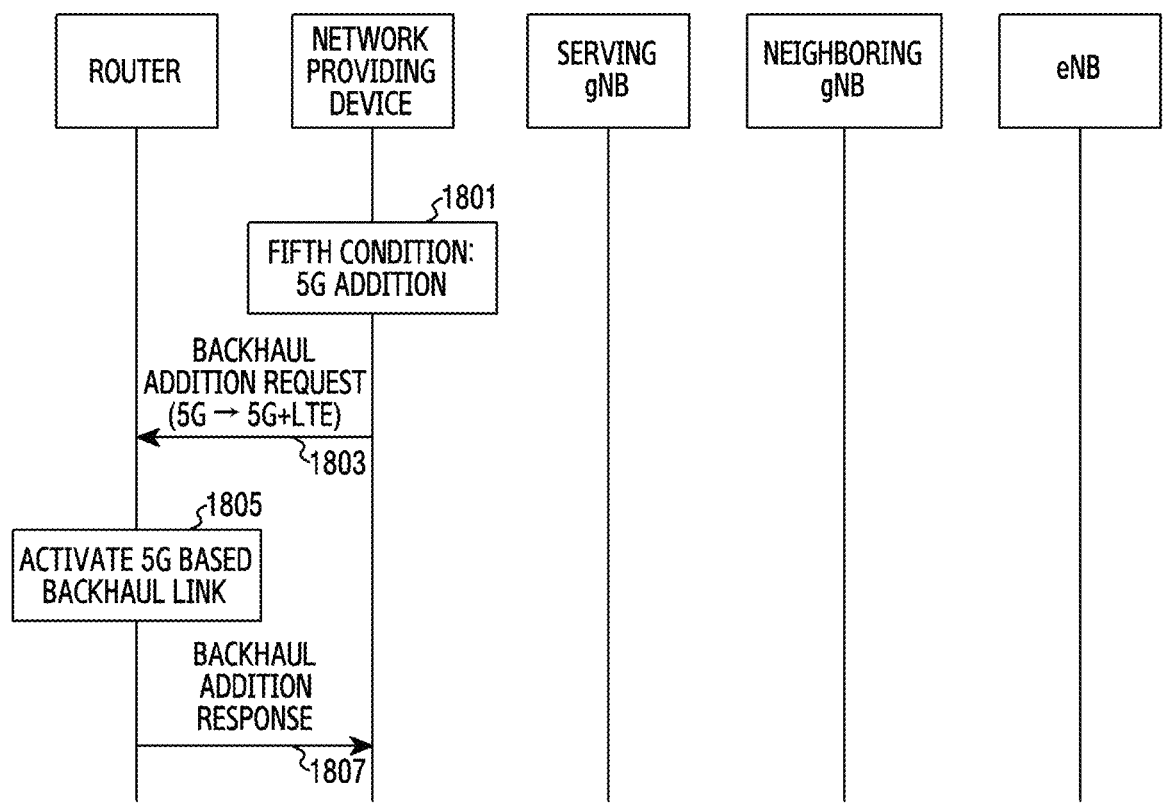
FIG. 18 illustrates a signal flow for a backhaul link change of a fifth type according to various embodiments of the present disclosure.

FIG. 18 illustrates a signal flow for a backhaul link change of a fifth type according to various embodiments of the present disclosure. Here, the fifth type exemplifies the fifth type 335 of FIG. 3. Through operations of FIG. 18, a 5G backhaul link may be added to an LTE backhaul link. A backhaul interface mode may be changed from an LTE mode to a 5G plus LTE mode.

Referring to FIG. 18, in step 1801, the network providing device may determine that a fifth condition is satisfied. The network providing device may determine the satisfaction or non-satisfaction of the fifth condition, based on a traffic state in a 5G network, a characteristic of a packet flow, and a state of a first backhaul link (i.e., a 5G backhaul link) providing access to the current 5G network. For example, although a channel quality of the 5G network is high, in response to there being a flow required to be serviced to an LTE network, the network providing device may determine the satisfaction of the fifth condition. For another example, in response to it not being enough to service all flows with only the LTE based backhaul link, the network providing device may determine that the fifth condition is fulfilled. As an example, in response to it being difficult that a data rate required by the added packet flow is achieved with only the LTE based backhaul link, the network providing device may determine that the fifth condition is fulfilled. For further example, in response to the added flow being required to be serviced to the 5G based backhaul link, the network providing device may determine that the fifth condition is fulfilled.

In step 1803, the network providing device may transmit a control message of requesting for the addition of a backhaul link, to the router. The control message may indicate the addition of a first backhaul link related with 5G. In accordance with various embodiments, the control message may include information on a backhaul link that will be added, an LTE power management policy, a Wi-Fi power management policy, a per-flow backhaul link, etc. In some embodiments, in response to the network providing device being RRC connected with a cellular network (e.g., NR) providing the 5G communication system, the network providing device may provide connection in the 5G network as the first backhaul link. In other some embodiments, in response to the network providing device not being RRC connected with the cellular network providing the 5G communication system, the network providing device may establish the RRC connection through an RRC connection setup procedure.

In step 1805, the router may add the 5G based backhaul link. That is, the router may additionally configure a backhaul link configured to access the 5G network, besides the backhaul link configured to access the LTE network. The router may change a backhaul interface mode into a 5G plus LTE mode. By adding the first backhaul link, the router may access the 5G network.

In step 1807, in response to the backhaul addition request of step 1803, the router may transmit a backhaul addition response message to the network providing device. According to various embodiments, the backhaul addition response message may include an LTE power management policy, a Wi-Fi power management policy, traffic state information, etc. The network providing device may receive the backhaul addition response message. Through the backhaul addition response message, the network providing device may confirm that the addition of backhaul has been completed. After receiving the backhaul addition response message, the network providing device may transmit a packet for configuring a per-flow backhaul link.

Figure 19:
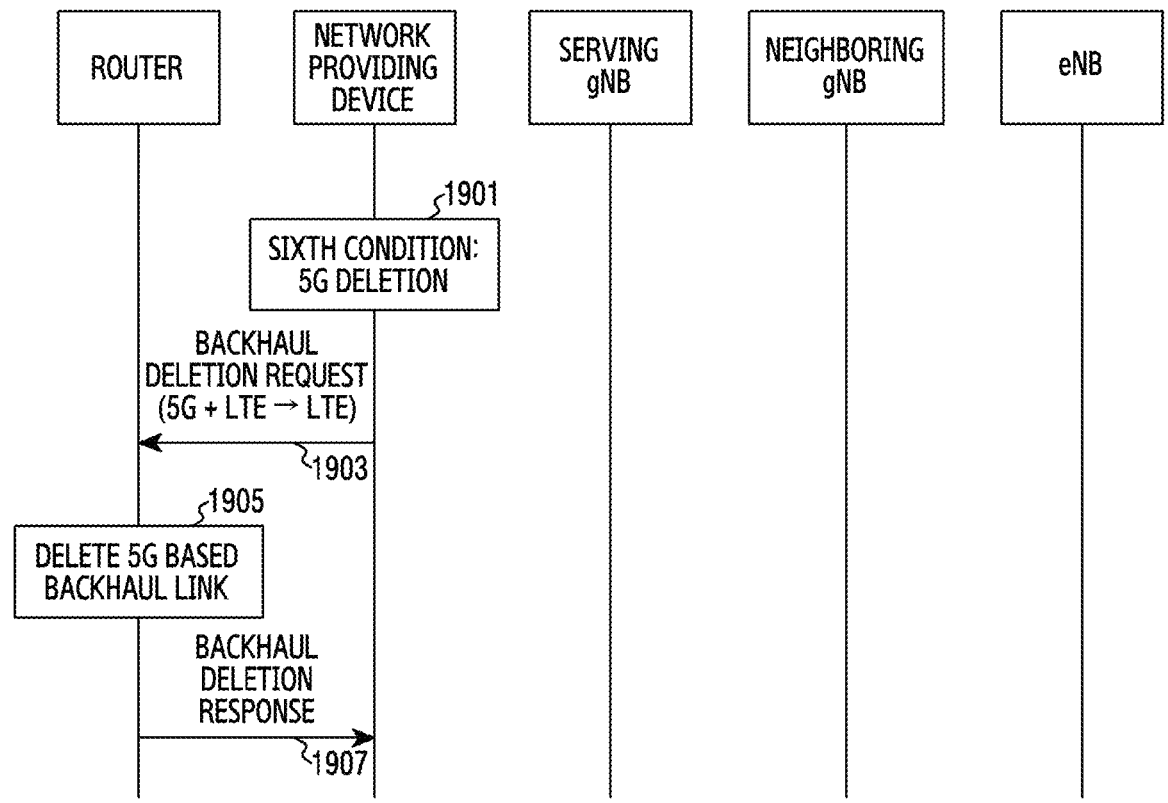
FIG. 19 illustrates a signal flow for a backhaul link change of a sixth type according to various embodiments of the present disclosure.

FIG. 19 illustrates a signal flow for a backhaul link change of a sixth type according to various embodiments of the present disclosure. Here, the sixth type exemplifies the sixth type 336 of FIG. 3. Through operations of FIG. 19, a 5G backhaul link may be deleted among the 5G backhaul link and an LTE backhaul link. A backhaul interface mode may be changed from a 5G plus LTE mode to an LTE mode.

Referring to FIG. 19, in step 1901, the network providing device may determine that a sixth condition is satisfied. The network providing device may be equipment for providing a wireless access of a 5G communication system. The network providing device may determine the satisfaction or non-satisfaction of the sixth condition, based on at least one of a traffic state in a 5G network, a characteristic of a packet flow, and a state of a first backhaul link (i.e., a 5G based backhaul link) providing access to the current 5G network. For example, in response to service flows requiring the 5G based backhaul link being all terminated, the network providing device may determine the satisfaction of the sixth condition. For another example, in response to the 5G communication quality being decreased less than a threshold, the network providing device may determine the satisfaction of the sixth condition. For further example, in response to a quality of a wireless link between the network providing device and the router being less than the threshold, the network providing device may determine the satisfaction of the sixth condition.

In step 1903, the network providing device may transmit a control message of requesting for the deletion of a backhaul link, to the router. The control message may indicate the deletion of the first backhaul link related with 5G. In accordance with various embodiments, the control message may include information on a backhaul link that will be deleted, an LTE power management policy, a Wi-Fi power management policy, a per-flow backhaul link, etc.

In step 1905, the router may delete the 5G based backhaul link. The router may release, in a backhaul interface, the backhaul link configured to access the 5G network. The router may set a backhaul interface mode to the LTE mode. The router may configure only the second backhaul link as the backhaul link.

In step 1907, in response to the backhaul deletion request of step 1903, the router may transmit a backhaul deletion response message to the network providing device. According to various embodiments, the backhaul deletion response message may include an LTE power management policy, a Wi-Fi power management policy, traffic state information, etc. After receiving the backhaul deletion response, the network providing device may transmit a backhaul configuration packet per flow. By receiving the backhaul deletion response message, the network providing device may confirm that the deletion of backhaul has been completed.

Though not illustrated in FIG. 19, in some embodiments, the network providing device may change a wireless LAN module into a power saving mode (PSM) state in compliance with a wireless LAN power management policy. This is because a utilization of a link between the router and the network providing device is decreased. Additionally, in response to 5G connection existing, the network providing device may inactivate the 5G connection. As an example, the network providing device may transmit a signal to a serving base station wherein an RRC connection state with the 5G network is switched to RRC IDLE or RRC INACTIVE.

Figure 20:
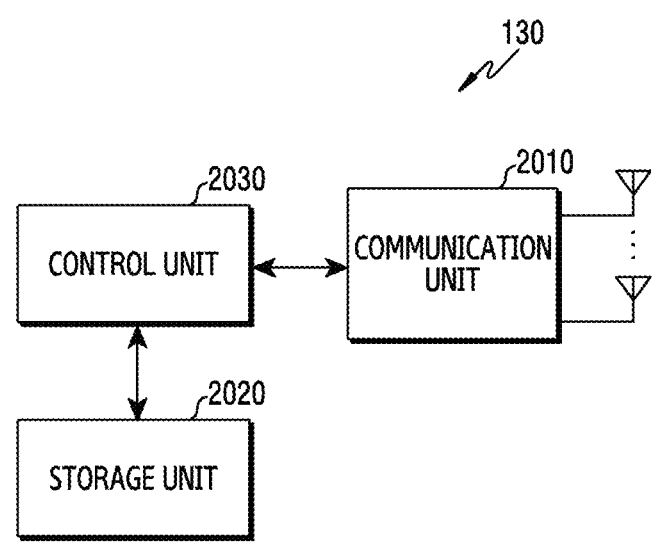
FIG. 20 illustrates a functional construction of a router according to various embodiments of the present disclosure.

FIG. 20 illustrates a functional construction of a router according to various embodiments of the present disclosure. The construction exemplified in FIG. 20 may be understood as a construction of the router 130 of FIG. 1. The terms ' . . . unit', ' . . . er', etc. used below represent the unit of processing at least one function or operation. These terms may be implemented by hardware, software or a combination of hardware and software.

Referring to FIG. 20, the router includes a communication unit 2010, a storage unit 2020, and a control unit 2030.

The communication unit 2010 may perform functions for transceiving a signal in a wired communication environment. The communication unit 2010 may include a wired interface for controlling direct connection between a device and a device through a transmission medium (e.g., a copper wire and an optical fiber). For example, the communication unit 2010 may forward an electrical signal to another device through a copper wire, or perform conversion between an electrical signal and an optical signal.

The communication unit 2010 performs functions for transceiving a signal through a wireless channel as well. For example, the communication unit 2010 performs a function of conversion between a baseband signal and a bit stream in compliance with the physical layer standard of a system. For example, at data transmission, the communication unit 2010 provides complex symbols by encoding and modulating a transmission bit stream. Also, at data reception, the communication unit 2010 restores a reception bit stream by demodulating and decoding a baseband signal. Also, the communication unit 2010 up converts a baseband signal into an RF band signal and then transmits the RF band signal through an antenna, and down converts an RF band signal received through the antenna into a baseband signal. For example, the communication unit 2010 may include a transmission filter, a reception filter, an amplifier, a mixer, an oscillator, a digital to analog converter (DAC), an analog to digital converter (ADC), etc.

Also, the communication unit 2010 may include a plurality of transceiving paths. Furthermore, the communication unit 2010 may include at least one antenna array comprised of a plurality of antenna elements. In aspect of hardware, the communication unit 2010 may be comprised of a digital circuitry and an analog circuitry (e.g., a radio frequency integrated circuit (RFIC)). Here, the digital circuitry and the analog circuitry may be implemented as one package. Also, the communication unit 2010 may include a plurality of RF chains. Furthermore, the communication unit 2010 may perform beamforming. To grant a directivity that is set by the control unit 2030 to a signal intended to be transceived, the communication unit 2010 may apply a beamforming weight to the signal.

Also, the communication unit 2010 may transceive a signal. The communication unit 2010 may receive a downlink signal. Also, the communication unit 2010 may transmit an uplink signal. Also, the communication unit 2010 may include mutually different communication modules so as to process mutually different frequency band signals. Furthermore, the communication unit 2010 may include a plurality of communication modules in order to support a mutually different plurality of wireless access technologies. For example, the mutually different wireless access technologies may include Bluetooth low energy (BLE), wireless fidelity (Wi-Fi), WiFi gigabyte (WiGig), a cellular network (e.g., long term evolution (LTE), etc. Also, mutually different frequency bands may include a super high frequency (SHF) (e.g., 2.5 GHz and 5 GHz) band, and/or a millimeter wave (mmWave) (e.g., 28 GHz, 38 GHz, and 60 GHz, etc.) band. According to various embodiments, the communication unit 2010 may include a wired communication interface supporting wired connection such as Ethernet, an LTE communication interface for accessing an LTE network, and/or a wireless communication interface providing a wireless LAN such as Wi-Fi. A router may be interlocked with a network providing device through a wireless LAN interface.

The communication unit 2010 transmits and receives a signal as mentioned above. Accordingly to this, the entire or part of the communication unit 2010 may be denoted as a 'transmitting unit', a 'receiving unit' or a 'transceiving unit'. Also, in the following description, transmission and reception performed through a wireless channel are used as a meaning including that the aforementioned processing is performed by the communication unit 2010. According to various embodiments, the communication unit 2010 may include at least one transceiver.

The storage unit 2020 stores data such as a basic program for an operation of the router, an application program, setting information, etc. The storage unit 2020 may consist of a volatile memory, a non-volatile memory, or a combination of the volatile memory and the non-volatile memory. And, in response to a request of the control unit 2030, the storage unit 2020 provides the stored data.

The control unit 2030 controls general operations of the router. For example, the control unit 2030 transmits and receives a signal through the communication unit 2010. Also, the control unit 2030 records data in the storage unit 2020, and reads. And, the control unit 2030 may perform functions of a protocol stack required in the communication standard. For this, the control unit 2030 may include at least one processor or micro processor, or be part of the processor. Also, part of the communication unit 2010 and the control unit 2030 may be denoted as a communication processor (CP). The control unit 2030 may include various modules for performing communication.

In accordance with various embodiments, the control unit 2030 may include a traffic classifying unit (e.g., the traffic classifying module 210 of FIG. 2A or the traffic classifying module 210 of FIG. 2B) and a backhaul link configuring unit (e.g., the backhaul link configuring module 230 of FIG. 2A or the backhaul link configuring module 230 of FIG. 2B). Here, the traffic classifying unit and the backhaul link configuring unit may be an instruction/code at least temporarily resided in the control unit 2030 as an instruction set or code stored in the storage unit 2020, or a storage space storing the instruction/code, or be a part of a circuitry configuring the control unit 2030, or a module for performing a function of the control unit 2030. In accordance with various embodiments, the control unit 2030 may control the router to perform operations of various embodiments described above. In accordance with an embodiment, the control unit 2030 may additionally include a backhaul link identifying unit as well.

A construction of the router illustrated in FIG. 20 is just an example, and the router is not limited to the construction illustrated in FIG. 20. That is, in accordance with various embodiments, some constructions may be added, deleted, and modified.

Figure 21:
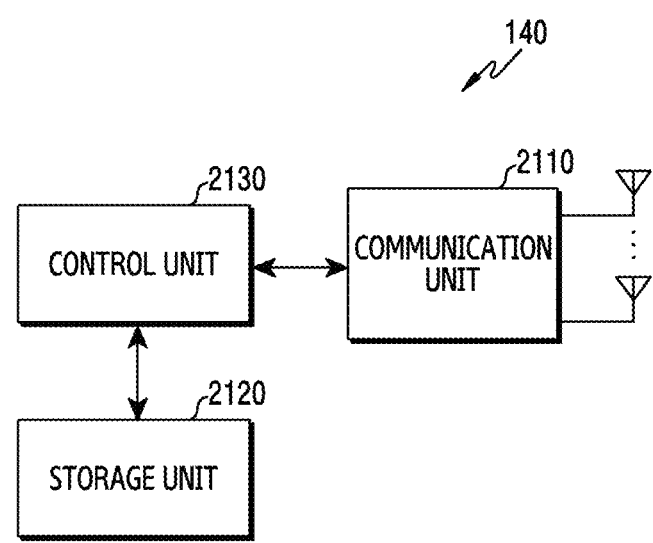
FIG. 21 illustrates a functional construction of a network providing device according to various embodiments of the present disclosure.

FIG. 21 illustrates a functional construction of a network providing device according to various embodiments of the present disclosure. The construction exemplified in FIG. 21 may be understood as a construction of the network providing device 140 of FIG. 1. The terms '... unit', '... er', etc. used below represent the unit of processing at least one function or operation. These terms may be implemented by hardware, software or a combination of hardware and software.

Referring to FIG. 21, the network providing device includes a communication unit 2110, a storage unit 2120, and a control unit 2130.

The communication unit 2110 may perform functions for transceiving a signal through a wireless channel as well. For example, the communication unit 2110 performs a function of conversion between a baseband signal and a bit stream in compliance with the physical layer standard of a system. For example, at data transmission, the communication unit 2110 provides complex symbols by encoding and modulating a transmission bit stream. Also, at data reception, the communication unit 2110 restores a reception bit stream by demodulating and decoding a baseband signal. Also, the communication unit 2110 up converts a baseband signal into an RF band signal and then transmits the RF band signal through an antenna, and down converts an RF band signal received through the antenna into a baseband signal. For example, the communication unit 2110 may include a transmission filter, a reception filter, an amplifier, a mixer, an oscillator, a DAC, an ADC, etc.

In some embodiments, the communication unit 2110 may perform functions for transceiving a signal in a wired communication environment. The communication unit 2110 may include a wired interface for controlling direct connection with a router through a transmission medium (e.g., a copper wire and an optical fiber). The communication unit 2110 may include an Ethernet module. The communication unit 2110 may forward an electrical signal to the router through a copper wire, or perform conversion between an electrical signal and an optical signal.

Also, the communication unit 2110 may include a plurality of transceiving paths. Furthermore, the communication unit 2110 may include at least one antenna array comprised of a plurality of antenna elements. In aspect of hardware, the communication unit 2110 may be comprised of a digital circuitry and an analog circuitry (e.g., a radio frequency integrated circuit (RFIC)). Here, the digital circuitry and the analog circuitry may be implemented as one package. Also, the communication unit 2110 may include a plurality of RF chains. The communication unit 2110 may perform beamforming. To grant a directivity that is set by the control unit 2130 to a signal intended to be transceived, the communication unit 2110 may apply a beamforming weight to the signal.

Also, the communication unit 2110 may transceive a signal. The communication unit 2110 may receive a downlink signal. Also, the communication unit 2110 may transmit an uplink signal. Also, the communication unit 2110 may include mutually different communication modules so as to process mutually different frequency band signals. Furthermore, the communication unit 2110 may include a plurality of communication modules in order to support a mutually different plurality of wireless access technologies. For example, the mutually different wireless access technologies may include Bluetooth low energy (BLE), wireless fidelity (Wi-Fi), WiFi gigabyte (WiGig), a cellular network (e.g., long term evolution (LTE), pre-5G, new radio (NR)), etc. Also, mutually different frequency bands may include a super high frequency (SHF) (e.g., 2.5 GHz and 5 GHz) band, and/or a millimeter wave (mmWave) (e.g., 28 GHz, 38 GHz, and 60 GHz, etc.) band. Also, according to various embodiments, the communication unit 2110 may include a 5G communication interface for accessing a 5G network. Here, the 5G network may mean a network provided by a communication system which supports mmWave.

Also, the communication unit 2110 may include a wireless LAN interface. The network providing device may be interlocked with the router through the wireless LAN interface.

The communication unit 2110 transmits and receives a signal as mentioned above. Accordingly to this, the entire or part of the communication unit 2110 may be denoted as a 'transmitting unit', a 'receiving unit' or a 'transceiving unit'. Also, in the following description, transmission and reception performed through a wireless channel are used as a meaning including that the aforementioned processing is performed by the communication unit 2110. According to various embodiments, the communication 2110 may include at least one transceiver.

The storage unit 2120 stores data such as a basic program for an operation of the router, an application program, setting information, etc. The storage unit 2120 may consist of a volatile memory, a non-volatile memory, or a combination of the volatile memory and the non-volatile memory. And, in response to a request of the control unit 2130, the storage unit 2120 provides the stored data.

The control unit 2130 controls general operations of the network providing device. For example, the control unit 2130 transmits and receives a signal through the communication unit 2110. For example, the control unit 2130 records data in the storage unit 2020, and reads. And, the control unit 2130 may perform functions of a protocol stack required in the communication standard. For this, the control unit 2130 may include at least one processor or micro processor, or be part of the processor. Also, part of the communication unit 2110 and the control unit 2130 may be denoted as a CP. The control unit 2130 may include various modules for performing communication.

According to various embodiments, the control unit 2130 may include a backhaul link identifying unit (e.g., the backhaul link identifying unit 221 of FIG. 2A or the backhaul link identifying unit 221 of FIG. 2B) and a link monitoring unit (e.g., the link monitoring module 223 of FIG. 2A or the link monitoring module 223 of FIG. 2B). Here, the backhaul link identifying unit and the link monitoring unit may be an instruction/code at least temporarily resided in the control unit 2130 as an instruction set or code stored in the storage unit 2120, or a storage space storing the instruction/code, or be a part of a circuitry configuring the control unit 2130, or a module for performing a function of the control unit 2130. In accordance with various embodiments, the control unit 2130 may control the network providing device to perform operations of various embodiments described above. In accordance with an embodiment, the control unit 2130 may additionally include a backhaul link identifying unit as well.

A construction of the network providing device illustrated in FIG. 21 is just an example, and the network providing device is not limited to the construction illustrated in FIG. 21. That is, in accordance with various embodiments, some constructions may be added, deleted, and modified.

In the present disclosure, to distinguish whether a specific condition is fulfilled, the expression of 'equal to or more than' or 'equal to or less than' has been used, but this is merely a statement for expressing an example, and does not exclude a statement of 'exceeding' or 'less than'. A condition stated as 'equal to or more than' may be replaced with 'exceeding', and a condition stated as 'equal to or less than' may be replaced with 'less than', and a condition stated as 'equal to or more than and less than' may be replaced with 'exceeding and equal to or less than'.

To perform various embodiments of the present disclosure, a router configuring backhaul and a network providing device monitoring a 5G network may be constructed. Through the router and the network providing device, stable backhaul switching may be performed. Particularly, by considering not only a channel state of a 5G network but also a link between the router and the network providing device, a mmWave characteristic in a 5G communication system may be utilized and concurrently, indoor wireless coverage may be easily secured.

Methods of embodiments mentioned in the claims or specification of the disclosure may be implemented in the form of hardware, software, or a combination of the hardware and the software.

In response to being implemented by the software, a computer-readable storage media storing one or more programs (i.e., software modules) may be provided. The one or more programs stored in the computer-readable storage media are configured to be executable by one or more processors of an electronic device. The one or more programs include instructions for enabling the electronic device to execute the methods of the embodiments stated in the claims or specification of the disclosure.

These programs (i.e., software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), digital versatile discs (DVDs), an optical storage device of another form, and/or a magnetic cassette. Or, the program may be stored in a memory that is configured in combination of some or all of them. Also, each configured memory may be included in plural as well.

Also, the program may be stored in an attachable storage device that may access through a communication network such as the Internet, an intranet, a local area network (LAN), a wide area network (WAN), or a storage area network (SAN), or a communication network configured in combination of them. This storage device may access a device performing an embodiment of the present disclosure through an external port. Also, a separate storage device on the communication network may access the device performing the embodiment of the present disclosure as well.

In the aforementioned concrete embodiments of the disclosure, constituent elements included in the disclosure have been expressed in the singular or plural according to a proposed concrete embodiment. But, the expression of the singular form or plural form is selected suitable to a given situation for the sake of description convenience, and the present disclosure is not limited to singular or plural constituent elements. Even if a constituent element is expressed in the plural form, it may be constructed in the singular form, or even if a constituent element is expressed in the singular form, it may be constructed in the plural form.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a network providing device, the method comprising:
   acquiring a measurement result of a signal transmitted by a first base station of a first cellular network accessible by a router via the network providing device over a first backhaul link, wherein the router is connected to one or more user equipment (UE);
   determining whether the measurement result is less than a channel quality threshold;
   obtaining a link quality between the network providing device and the router;
   determining whether to switch network access to a second base station of a second cellular network over a second backhaul link, which is different from the first cellular network, identified based on the measurement result and the link quality; and
   transmitting, to the router, a first control message for configuring the router to switch network access to the second cellular network over the second backhaul link, based on a result of the determination.

2. The method of claim 1, further comprising:
   in case that measurement result is greater than the channel quality threshold, and the link quality is greater than a link quality threshold,
   generating a second control message for configuring the router to access the first cellular network over the first backhaul link; and
   transmitting the second control message.

3. The method of claim 1,
   wherein the network providing device is customer-premises equipment (CPE) supporting the first cellular network,
   wherein the first cellular network is a new radio (NR) based network, and
   wherein the second cellular network is a long term evolution (LTE) based network.

4. A network providing device comprising:
   at least one transceiver; and
   at least one processor operatively coupled with the at least one transceiver,
   wherein the at least one processor is configured to:
   acquire a measurement result of a signal transmitted by a first base station of a first cellular network accessible by a router via the network providing device over a first backhaul link, wherein the router is connected to one or more user equipment (UE);

determine whether the measurement result is less than a channel quality threshold;

obtain a link quality between the network providing device and the router;

determine whether to switch network access to a second base station of a second cellular network over a second backhaul link, which is different from the first cellular network, identified based on the measurement result and the link quality; and transmit, to the router, a first control message for setting a router to switch network access to the second cellular network over the second backhaul link, based on a result of the determination.

5. The network providing device of claim 4, wherein the at least one processor is configured to:

in case that the measurement result is greater than the channel quality threshold, and the link quality is greater than a link quality threshold, generate a second control message for setting the router to access the first cellular network over the first backhaul link; and transmit the second control message.

6. The network providing device of claim 4, wherein the network providing device is a customer-premises equipment (CPE) supporting the first cellular network, wherein the first cellular network is a new radio (NR) based network, and wherein the second cellular network is a long term evolution (LTE) based network.

* * * * *